United States Patent
Kurita et al.

(10) Patent No.: US 10,280,293 B2
(45) Date of Patent: May 7, 2019

(54) THERMOPLASTIC ELASTOMER COMPOSITION AND METHOD FOR PRODUCING SAME

(71) Applicant: MITSUI CHEMICALS, INC., Minato-ku, Tokyo (JP)

(72) Inventors: Hayato Kurita, Ichihara (JP); Mizuki Wakana, Ichihara (JP); Takahiro Kondo, Ichihara (JP); Hideki Mochizuki, Chiba (JP); Yuji Noguchi, Funabashi (JP); Tatsuya Sakai, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 31 days.

(21) Appl. No.: 15/559,273

(22) PCT Filed: Mar. 17, 2016

(86) PCT No.: PCT/JP2016/058468
§ 371 (c)(1),
(2) Date: Sep. 18, 2017

(87) PCT Pub. No.: WO2016/152710
PCT Pub. Date: Sep. 29, 2016

(65) Prior Publication Data
US 2018/0086904 A1 Mar. 29, 2018

(30) Foreign Application Priority Data

Mar. 20, 2015 (JP) .................. 2015-057726
Mar. 20, 2015 (JP) .................. 2015-057727

(51) Int. Cl.
| | |
|---|---|
| C08L 23/10 | (2006.01) |
| C08K 5/14 | (2006.01) |
| C08L 23/02 | (2006.01) |
| C08L 23/16 | (2006.01) |
| C08J 3/24 | (2006.01) |
| C08L 23/08 | (2006.01) |
| C08L 53/00 | (2006.01) |

(52) U.S. Cl.
CPC ............. *C08L 23/10* (2013.01); *C08J 3/246* (2013.01); *C08K 5/14* (2013.01); *C08L 23/02* (2013.01); *C08L 23/083* (2013.01); *C08L 23/16* (2013.01); *C08L 53/00* (2013.01); *C08J 2323/10* (2013.01); *C08J 2423/16* (2013.01); *C08L 2205/02* (2013.01); *C08L 2205/03* (2013.01); *C08L 2312/00* (2013.01)

(58) Field of Classification Search
CPC ......... C08K 5/14; C08L 23/02; C08L 23/083; C08L 53/00; C08L 23/16; C08L 23/10; C08L 23/12; C08L 23/14; C08L 2205/02; C08L 2205/03; C08J 3/246; C08J 2323/10; C08J 2423/16
See application file for complete search history.

(56) References Cited

U.S. PATENT DOCUMENTS

| | | |
|---|---|---|
| 5,155,080 A | 10/1992 | Elder et al. |
| 5,321,106 A | 6/1994 | Lapointe |
| 5,387,568 A | 2/1995 | Ewen et al. |
| 5,519,100 A | 5/1996 | Ewen et al. |
| 5,614,457 A | 3/1997 | Ewen et al. |
| 5,663,249 A | 9/1997 | Ewen et al. |
| 5,883,202 A | 3/1999 | Ewen et al. |
| 6,635,705 B2 | 10/2003 | Itoh et al. |
| 6,939,928 B1 | 9/2005 | Kawai et al. |
| 2002/0055591 A1 | 5/2002 | Itoh et al. |
| 2005/0228155 A1 | 10/2005 | Kawai et al. |
| 2006/0161013 A1 | 7/2006 | Tohi et al. |
| 2008/0085977 A1 | 4/2008 | Okamoto et al. |

(Continued)

FOREIGN PATENT DOCUMENTS

| | | |
|---|---|---|
| EP | 0 427 696 | 5/1991 |
| EP | 0 427 697 | 5/1991 |

(Continued)

OTHER PUBLICATIONS

Extended European Search Report dated Sep. 20, 2018 in European Patent Application No. 16768613.8. 8 pages.
Hansch, et al., "A Survey of Hammett Substituent Constants and Resonance and Field Parameters", Chemical Reviews (1991), V. 91, No. 2, pp. 164-195.
Hsieh, et al., "Ethylene-1-Butene Copolymers. 1. Comonomer Sequence Distribution", Macromolecules (1982), V. 15, pp. 353-360.
Laine, et al., "Elemental Reactions in Copolymerization of a-Olefins by Bis(cyclopentadienyl) Zirconocene and Hafnocene: Effects of the Metal as a Function of the Monomer and the Chain End", Organometallics (2011), V. 30, Issue 6, pp. 1350-1358.

(Continued)

*Primary Examiner* — Nathan M Nutter
(74) *Attorney, Agent, or Firm* — Foley & Lardner LLP

(57) ABSTRACT

Provided is a thermoplastic elastomer composition with which it is possible to obtain a molded article having exceptional low-temperature impact resistance. A thermoplastic elastomer composition is produced that contains a crystalline olefin polymer (A) and an ethylene-α-olefin ($C_{4-20}$)-unconjugated polyene copolymer (B) that satisfies requirements (1) and (2). (1) The B value represented by the equation: $([EX]+2[Y])/(2\times[E]\times([X]+[Y]))$ is 1.20 or higher. [E], [X] and [Y] respectively indicate the molar fraction of structural units derived from ethylene, the molar fraction of structural units derived from $C_{4-20}$ α-olefin and the molar fraction of structural units derived from unconjugated polyene, and [EX] indicates the diad chain fraction of structural units derived from ethylene-structural units derived from $C_{4-20}$ α-olefin. (2) The molar ratio of structural units derived from ethylene with respect to structural units derived from α-olefin ($C_{4-20}$) of copolymer (B) is 40/60-90/10.

15 Claims, No Drawings

(56) References Cited

U.S. PATENT DOCUMENTS

| | | |
|---|---|---|
| 2008/0220193 A1 | 9/2008 | Tohi et al. |
| 2016/0280819 A1 | 9/2016 | Tohi et al. |
| 2016/0347894 A1 | 12/2016 | Endo et al. |
| 2017/0183432 A1 | 6/2017 | Endo et al. |

FOREIGN PATENT DOCUMENTS

| | | |
|---|---|---|
| EP | 1640415 A2 | 3/2006 |
| JP | 01-501950 | 7/1989 |
| JP | 01-502036 | 7/1989 |
| JP | 03-179005 | 8/1991 |
| JP | 03-179006 | 8/1991 |
| JP | 03-207703 | 9/1991 |
| JP | 03-207704 | 9/1991 |
| JP | 09-012797 | 1/1997 |
| JP | 2000-212194 | 8/2000 |
| JP | 2002-146105 | 5/2002 |
| JP | 2004-168744 | 6/2004 |
| JP | 2004-175759 | 6/2004 |
| JP | 2011-001489 | 1/2011 |
| JP | 2011-001497 | 1/2011 |
| JP | 2011-219777 | 11/2011 |
| WO | WO-88/05792 | 8/1988 |
| WO | WO-88/05793 | 8/1988 |
| WO | WO-98/05792 | 2/1998 |
| WO | WO-98/05793 | 2/1998 |
| WO | WO-01/27124 | 4/2001 |
| WO | WO-2006/123759 | 11/2006 |
| WO | WO-2015/122414 | 8/2015 |
| WO | WO-2015/122415 | 8/2015 |

OTHER PUBLICATIONS

Patsidis, et al., "The Synthesis, Characterization and Polymerization Behavior of Ansa Cyclopentadienyl Fluorenyl Complexes; the X-ray structures of the complexes[(C13H8) SiR2(C5H4)]ZrCl2(R= Me or Ph)", Journal of Organometallic Chemistry (1996). V. 509, pp. 63-71.

Prakash, et al., "N-Carboethoxpiperidine, A Convenient Reagent for the Preparation of Symmetrical Ketones from Organolithiums1", Heterocycles (1995), V. 40, No. 1, pp. 78-83.

Ray, et al., "Carbon-13 Nuclear Magnetic Resonance Determination of Monomer Composition and Sequence Distributors in Ethylene-Propylene Copolymers Prepared with a Stereoregular Catalyst System", Macromolecules (1977), V. 10, No. 4, pp. 773-778.

International Search Report issued in International Patent Application No. PCT/JP2016/058468 dated Jun. 21, 2016.

THERMOPLASTIC ELASTOMER COMPOSITION AND METHOD FOR PRODUCING SAME

RELATED APPLICATIONS

The present application claims priority under 35 USC 371 to International Patent Application number PCT/JP2016/058468, filed Mar. 17, 2016, which claims priority to Japanese Patent Application No. JP2015-057726, filed Mar. 20, 2015 and Japanese Patent Application No. JP2015-057727, filed Mar. 20, 2015. The contents of these applications are hereby incorporated by reference in their entireties.

TECHNICAL FIELD

The present invention relates to thermoplastic elastomer compositions that can provide molded articles having an excellent low-temperature impact resistance. The present invention specifically relates to thermoplastic elastomer compositions that can provide molded articles having an excellent low-temperature impact resistance and mechanical properties, thermoplastic elastomer compositions that can provide molded articles having an excellent low-temperature impact resistance and low-temperature elongation at break, and methods for producing the same.

BACKGROUND ART

Olefin-based thermoplastic elastomers are lightweight and easy to recycle, and hence are widely used for automobile parts, industrial machine parts, electronic and electrical parts, construction materials, and the like, as thermoplastic elastomers of an energy saving and resources saving type, particularly as substitutes for vulcanized rubbers.

However, conventional olefin-based thermoplastic elastomers have the disadvantage of being inferior in tensile strength, fracture elongation, and compression set, compared to vulcanized rubbers, and improvement therein has been strongly demanded.

As an olefin-based thermoplastic elastomer improved in these characteristics, a thermoplastic elastomer obtained by dynamically cross-linking a crystalline polyolefin resin and an ethylene.propylene.non-conjugated polyene copolymer rubber under specific conditions is proposed in Patent Document 1.

In some applications (for example, automobile parts applications), a thermoplastic elastomer that is positively not cross-linked and obtained by only dynamic thermal treatment (dynamic kneading) may also be used (see Patent Document 2).

RELATED ART DOCUMENTS

Patent Documents

Patent Document 1: JP-A No. H09-012797
Patent Document 2: JP-A No. 2002-146105

SUMMARY OF INVENTION

Technical Problem

However, the dynamically cross-linked thermoplastic elastomer described in the Patent Document 1 has inferior low-temperature impact resistance compared to vulcanized rubber, hence a problem. In addition, mechanical properties such as tensile properties for the thermoplastic elastomer have also needed to be improved.

The olefin-based thermoplastic elastomer in the Patent Document 2 that is not dynamically cross-linked has inferior low-temperature impact resistance compared to vulcanized rubber, hence a problem. In some cases, there has been a problem with the elongation at break at low temperature.

An object of the present invention is to provide a thermoplastic elastomer composition that can provide a molded article having an excellent low-temperature impact resistance.

Another object of the present invention is to provide a thermoplastic elastomer composition that can provide a molded article having an excellent low-temperature impact resistance and having excellent mechanical properties such as tensile strength and tensile elongation.

Another object of the present invention is to provide a thermoplastic elastomer composition that can provide a molded article having an impact resistance and an elongation at break that are excellent at low temperature.

Solution to Problem

The present inventors have made intensive studies to solve the aforementioned problems.

As a result, they have found that a thermoplastic elastomer composition containing a crystalline olefin polymer and a specific ethylene.α-olefin.non-conjugated polyene copolymer can provide a molded article having an excellent low-temperature impact resistance in particular, and have come to complete the present invention.

They have found that a thermoplastic elastomer composition obtained by dynamically cross-linking a crystalline olefin polymer, a specific ethylene.α-olefin.non-conjugated polyene copolymer, and a peroxide-based cross-linking agent can provide a molded article having an excellent low-temperature impact resistance and excellent mechanical properties such as tensile properties, and have come to complete the present invention.

They have found that a thermoplastic elastomer composition containing a crystalline olefin polymer, a specific ethylene.α-olefin.non-conjugated polyene copolymer, and an ethylene.α-olefin copolymer at a specific ratio can provide a molded article having an excellent low-temperature impact resistance and an excellent elongation at break, and have come to complete the present invention.

A thermoplastic elastomer composition according to the present invention (herein also referred to as composition (I)) is characterized by containing a crystalline olefin polymer (A) and an ethylene.α-olefin ($C_4$-$C_{20}$).non-conjugated polyene copolymer (B) satisfying the following requirements (1) and (2).

(1) A B value represented by the following equation (i) is 1.20 or more:

$$B \text{ value} = ([EX]+2[Y])/[2 \times [E] \times ([X]+[Y])] \qquad (i)$$

wherein [E], [X] and [Y] represent a mole fraction of structural units derived from the ethylene, a mole fraction of structural units derived from the $C_4$-$C_{20}$ α-olefin and a mole fraction of structural units derived from the non-conjugated polyene respectively, and [EX] represents a diad chain fraction of the structural units derived from the ethylene—the structural units derived from the $C_4$-$C_{20}$ α-olefin.

(2) In the copolymer (B), a molar ratio of the structural units derived from the ethylene to the structural units derived from the α-olefin ($C_4$-$C_{20}$) is 40/60 to 90/10.

A thermoplastic elastomer composition according to the present invention (herein also referred to as composition (II)) is characterized by being obtained by dynamically cross-linking the polymer (A), the copolymer (B) and a peroxide-based cross-linking agent (D).

The cross-linking agent (D) is preferably an organic peroxide. In the composition (II), the polymer (A) is preferably a propylene-based (co)polymer.

The compositions (I) and (II) preferably contain the polymer (A) and the copolymer (B) at a weight ratio of (A)/(B)=90/10 to 10/90.

A thermoplastic elastomer composition according to the present invention (herein also referred to as composition (III)) is characterized by containing 30 to 70 parts by weight of the polymer (A), 1 to 30 parts by weight of the copolymer (B) and 1 to 60 parts by weight of the ethylene.α-olefin ($C_3$ or more) copolymer (C) (provided that the total of the polymer (A), the copolymer (B) and the copolymer (C) is 100 parts by weight).

The composition (III) is preferably obtained by dynamic thermal treatment in the absence of a cross-linking agent.

In the composition (III), the polymer (A) is preferably a block copolymer of propylene and an α-olefin other than propylene. The copolymer (C) preferably has a melt flow rate (ASTM D1238, 2.16 kg load) of 0.01 to 50 (g/10 minutes) as measured at 190° C.

A method for producing the thermoplastic elastomer composition (II) is characterized by dynamically cross-linking a crystalline olefin polymer (A), an ethylene.αolefin ($C_4$-$C_{20}$).non-conjugated polyene copolymer (B) in which the B value represented by the equation (i) is 1.20 or more, and a peroxide-based cross-linking agent (D).

Preferably, the copolymer (B) further satisfies at least one of the following requirements (3) and (4).

(3) A Mooney viscosity $ML_{(1+4)}$(125° C.) of the copolymer (B) is 5 to 100.

(4) The content of the structural units derived from the non-conjugated polyene is 0.1 to 6.0 mol % relative to the total 100 mol % of the structural units derived from the ethylene, the structural units derived from the α-olefin ($C_4$-$C_{20}$) and the structural units derived from the non-conjugated polyene.

The α-olefin of the copolymer (B) is preferably 1-butene.

From the thermoplastic elastomer composition (I), molded articles having an excellent low-temperature impact resistance can be obtained, and automobile parts such as automobile airbag covers can be obtained in a preferred manner.

From the thermoplastic elastomer composition (II), molded articles having an excellent low-temperature impact resistance and having excellent mechanical properties such as tensile strength and tensile elongation can be obtained, and automobile parts such as automobile airbag covers can be obtained in a preferred manner.

From the thermoplastic elastomer composition (III), molded articles having an impact resistance and an elongation at break that are excellent at low temperature can be obtained. From the viewpoint that the thermoplastic elastomer allows the low-temperature impact resistance and elongation at break in particular to be enhanced, automobile parts used for the interior or exterior of automobiles, for example, automobile interior surface film materials and automobile airbag covers as automobile interior parts, and mud guards, spoiler lips and fender liners as automobile exterior parts are obtained in a preferred manner.

Advantageous Effects of Invention

The present invention can provide a thermoplastic elastomer composition capable of providing a molded article having an excellent low-temperature impact resistance.

The present invention can provide a thermoplastic elastomer composition capable of providing a molded article having an excellent low-temperature impact resistance and having excellent mechanical properties such as tensile strength and tensile elongation.

The present invention can provide a thermoplastic elastomer composition capable of providing a molded article having an impact resistance and an elongation at break that are excellent at low temperature.

DESCRIPTION OF EMBODIMENTS

<Thermoplastic Elastomer Composition>

The thermoplastic elastomer composition (I) according to the present invention contains a crystalline olefin polymer (A) and a specific ethylene.α-olefin ($C_4$-$C_{20}$).non-conjugated polyene copolymer (B).

The thermoplastic elastomer composition (II) according to the present invention is obtained by dynamically cross-linking a crystalline olefin polymer (A), a specific ethylene.α-olefin ($C_4$-$C_{20}$).non-conjugated polyene copolymer (B), and a peroxide-based cross-linking agent (D). The composition (II) is obtained by dynamically cross-linking at least the polymer (A) and the copolymer (B).

It is not until dynamically cross-linking the polymer (A) and the copolymer (B) with the cross-linking agent (D) that the composition (II) whose low-temperature impact resistance and mechanical properties are both excellent can be obtained.

The thermoplastic elastomer composition (III) according to the present invention contains a crystalline olefin polymer (A), a specific ethylene.α-olefin ($C_4$-$C_{20}$).non-conjugated polyene copolymer (B), and an ethylene.α-olefin ($C_3$ or more) copolymer (C) at a specific ratio.

<Crystalline Olefin Polymer (A)>

The crystalline olefin polymer (A) (herein also referred to as polymer (A)) is not limited to a particular one as long as it is a crystalline polymer obtained from an olefin, and is preferably a polymer including a crystalline high molecular weight solid product obtained by polymerizing one or more monoolefins either by a high-pressure method or a low-pressure method. Examples of such polymers include isotactic monoolefin polymers, syndiotactic monoolefin polymers, and the like.

The polymer (A) may be obtained by synthesis by a conventionally known method or may be commercially available.

The polymer (A) may be used singly or in combination of two or more kinds thereof.

Examples of monoolefins serving as raw materials of the polymer (A) include ethylene, propylene, 1-butene, 1-pentene, 1-hexene, 1-octene, 1-decene, 2-methyl-1-propene, 3-methyl-1-pentene, 4-methyl-1-pentene, 5-methyl-1-hexene, and the like. These olefins may be used singly or in mixture of two or more kinds thereof.

Among the polymers (A), propylene (co)polymers that are propylene homopolymers or propylene copolymers obtained from monoolefins which are mostly propylene are preferable in terms of formability and heat resistance. In regard to the propylene copolymers, the content of structural units derived from propylene is preferably 40 mol % or more, more preferably 50 mol % or more, and monoolefins as structural units derived from monomers other than propylene are preferably the aforementioned monoolefins other than propylene, more preferably ethylene or butene.

The polymerization manner may be a random type or a block type, and any polymerization manner may be adopted as long as a crystalline resinoid product is obtained.

The polymer (A) has an MFR (ASTM D1238-65T, 230° C., 2.16 kg load) of usually 0.01 to 150 (g/10 minutes), preferably 0.05 to 100 g/10 minutes, more preferably 0.05 to 50 g/10 minutes.

When a propylene copolymer of propylene as the polymer (A) and an α-olefin other than propylene is used in the composition (III), the copolymer may be either a random copolymer or a block copolymer, but a block copolymer is preferable in terms of impact resistance at low temperature. In this case, the polymer (A) has an MFR (ASTM D1238-65T, 230° C., 2.16 kg load) of usually 0.01 to 150 (g/10 minutes), preferably 0.05 to 100 g/10 minutes.

The polymer (A) has a melting point (Tm) of usually 100° C. or more, preferably 105° C. or more, as determined by differential scanning calorimetry (DSC). Differential scanning calorimetry is carried out in the following manner, for example. About 5 mg of sample is loaded into a dedicated aluminum pan, and, using the DSC Pyris 1 or DSC 7 made by PerkinElmer Co., Ltd., it is heated from 30° C. to 200° C. at 320° C./min, held at 200° C. for 5 minutes, cooled from 200° C. to 30° C. at 10° C./min, further held at 30° C. for 5 minutes, and then heated at 10° C./min, the endothermic curve of which the melting point is determined from. If multiple peaks are detected during DSC measurement, the peak temperature detected on the highest temperature side is defined as a melting point (Tm).

The polymer (A) plays a role of enhancing the fluidity and heat resistance of a thermoplastic elastomer composition. The composition preferably contains a specific amount of the polymer (A).

<Ethylene.α-olefin.Non-Conjugated Polyene Copolymer (B)>

The ethylene.α-olefin.non-conjugated polyene copolymer (B) used in the present invention (herein also referred to as copolymer (B)) contains a structural unit derived from ethylene, a structural unit derived from at least one $C_4$-$C_{20}$ α-olefin, and a structural unit derived from at least one non-conjugated polyene; wherein (1) a B value represented by the following equation (i) is 1.20 or more:

$$B \text{ value}=([EX]+2[Y])/[2\times[E]\times([X]+[Y])] \quad \text{(i)}$$

(wherein [E], [X] and [Y] represent a mole fraction of structural units derived from ethylene, a mole fraction of structural units derived from a $C_4$-$C_{20}$ α-olefin and a mole fraction of structural units derived from a non-conjugated polyene respectively, and [EX] represents a diad chain fraction of the structural units derived from the ethylene—the structural units derived from the $C_4$-$C_{20}$ α-olefin); and (2) in the copolymer (B), the molar ratio of the structural units derived from the ethylene to the structural units derived from the α-olefin ($C_4$-$C_{20}$) is 40/60 to 90/10.

Examples of $C_4$-$C_{20}$ α-olefins include: straight-chain α-olefins having no side chain, such as 1-butene ($C_4$), 1-nonene ($C_9$), 1-decene ($C_{10}$) 1-nonadecene ($C_{19}$) 1-eicosene ($C_{20}$); and α-olefins having a side chain, such as 4-methyl-1-pentene, 9-methyl-1-decene, 11-methyl-1-dodecene, and 12-ethyl-1-tetradecene, which have a side chain. These α-olefins may be used singly or in combination of two or more kinds thereof. Among these, $C_4$-$C_{10}$ α-olefins are preferable, 1-butene, 1-hexene, and 1-octene are more preferable, and 1-butene is still more preferable because 1-butene has excellent low-temperature impact resistance and mechanical properties such as tensile strength and tensile elongation and can enhance particularly an impact resistance and elongation at break at low temperature. An ethylene.propylene.non-conjugated polyene copolymer in which the α-olefin is propylene has an insufficient rubber elasticity at low temperature, and hence its uses may be limited.

Examples of non-conjugated polyenes include chain non-conjugated dienes such as 1,4-hexadiene, 1,6-octadiene, 2-methyl-1,5-hexadiene, 6-methyl-1,5-heptadiene, and 7-methyl-1,6-octadiene; cyclic non-conjugated dienes such as cyclohexadiene, dicyclopentadiene, methyltetrahydrindene, 5-vinyl-2-norbornene, 5-ethylidene-2-norbornene, 5-methylene-2-norbornene, 5-isopropylidene-2-norbornene, and 6-chloromethyl-5-isopropenyl-2-norbornene; trienes such as 2,3-diisopropylidene-5-norbornene, 2-ethylidene-3-isopropylidene-5-norbornene, 2-propenyl-2,5-norbornadiene, 1,3,7-octatriene, 1,4,9-decatriene, 4,8-dimethyl-1,4,8-decatriene, and 4-ethylidene-8-methyl-1,7-nonadiene. These non-conjugated polyenes may be used singly or in combination of two or more kinds thereof. Among these, cyclic non-conjugated dienes such as 1,4-hexadiene; 5-ethylidene-2-norbornene; 5-vinyl-2-norbornene; and mixtures of 5-ethylidene-2-norbornene and 5-vinyl-2-norbornene are preferable, and 5-ethylidene-2-norbornene and 5-vinyl-2-norbornene are more preferable.

Examples of the copolymers (B) include ethylene.1-butene.1,4-hexadiene copolymer, ethylene.1-pentene.1,4-hexadiene copolymer, ethylene.1-hexene.1,4-hexadiene copolymer, ethylene.1-heptene.1,4-hexadiene copolymer, ethylene.1-octene.1,4-hexadiene copolymer, ethylene.1-nonene.1,4-hexadiene copolymer, ethylene.1-decene.1,4-hexadiene copolymer, ethylene.1-butene.1-octene.1,4-hexadiene copolymer, ethylene.1-butene.5-ethylidene-2-norbornene copolymer, ethylene.1-pentene.5-ethylidene-2-norbornene copolymer, ethylene.1-hexene.5-ethylidene-2-norbornene copolymer, ethylene.1-heptene.5-ethylidene-2-norbornene copolymer, ethylene.1-octene.5-ethylidene-2-norbornene copolymer, ethylene.1-nonene.5-ethylidene-2-norbornene copolymer, ethylene.1-decene.5-ethylidene-2-norbornene copolymer, ethylene.1-butene.1-octene.5-ethylidene-2-norbornene copolymer, ethylene.1-butene.5-vinyl-2-norbornene copolymer, ethylene.1-pentene.5-ethylidene-2-norbornene.5-vinyl-2-norbornene copolymer, ethylene.1-hexene.5-ethylidene-2-norbornene.5-vinyl-2-norbornene copolymer, ethylene.1-heptene.5-ethylidene-2-norbornene.5-vinyl-2-norbornene copolymer, ethylene.1-octene.5-ethylidene-2-norbornene.5-vinyl-2-norbornene copolymer, ethylene.1-nonene.5-ethylidene-2-norbornene.5-vinyl-2-norbornene copolymer, ethylene.1-decene.5-ethylidene-2-norbornene.5-vinyl-2-norbornene copolymer, ethylene.1-butene.1-octene.5-ethylidene-2-norbornene.5-vinyl-2-norbornene copolymer, and the like.

The copolymer (B) may be used singly or in combination of two or more kinds thereof.

The copolymer (B) satisfies the requirement (1): a B value represented by the aforementioned equation (i) is in the range of 1.20 or more, preferably 1.20 to 1.80, particularly preferably 1.22 to 1.40.

The copolymer (B) having a B value of less than 1.20 may cause a large compression set at low temperature, and may fail to provide a thermoplastic elastomer composition having an excellent balance between rubber elasticity at low temperature and tensile strength at room temperature. A B value larger than 1.8 may undesirably make the alternativeness of monomers too high, reduce the crystallinity of the copolymer (B), and reduce the mechanical properties at room temperature.

Here, the B value is an index that is indicative of randomness of a copolymerization monomer sequence distribution in the copolymer (B), and [E], [X], [Y], and [EX] in the equation (i) can be determined by measuring $^{13}C$ NMR spectra and being based on the reports by J. C. Randall [Macromolecules, 15, 353 (1982)], J. Ray [Macromolecules, 10, 773 (1977)], and the like.

The copolymer (B) satisfies the requirement (2): the molar ratio ([A]/[B]) of the structural units derived from the ethylene [A] to the structural units derived from the α-olefin [B] is in the range of 40/60 to 90/10. The lower limit of the molar ratio [A]/[B] is preferably 45/55, more preferably 50/50, particularly preferably 55/45. The upper limit of the molar ratio [A]/[B] is preferably 80/20, more preferably 75/25, still more preferably 70/30, particularly preferably 65/35.

When the molar ratio of structural units derived from ethylene [A] to structural units derived from α-olefin [B] is in the aforementioned range, a thermoplastic elastomer composition that has an excellent balance between rubber elasticity at low temperature and tensile strength at room temperature can be obtained.

The present invention is preferable because the composition (III) contains a specific amount of the copolymer (B) and hence enhances the impact resistance and elongation at break at low temperature.

The copolymer (B) desirably satisfies at least one of the following requirements (3) and (4).

Requirement (3): the copolymer (B) has a Mooney viscosity $ML_{(1+4)}(125°\ C.)$ at 125° C. which is not limited to a particular value as long as it achieves the effects of the present invention and which is in the range of preferably 5 to 100, more preferably 20 to 95, still more preferably 50 to 90, as determined by measurement in accordance with JIS K6300 (1994).

When the Mooney viscosity is in the aforementioned range, the copolymer (B) tends to exhibit a favorable aftertreatment quality (suitability for ribbon handling) and have excellent rubber properties.

Requirement (4): in the copolymer (B), the content of structural units derived from the non-conjugated polyene [C] is in the range of 0.1 to 6.0 mol % based on the total of the structural units of [A], [B] and [C] as 100 mol %. The lower limit of the content of structural units derived from [C] is preferably 0.5 mol %. The upper limit of the content of structural units derived from [C] is preferably 4.0 mol %, more preferably 3.5 mol %, still more preferably 3.0 mol %. When the content of structural units derived from the non-conjugated polyene [C] is in the aforementioned range, an ethylene copolymer having an adequate cross-linkability and an impact resistance and elongation at break at low temperature tends to be obtained.

The copolymer (B) can be obtained by, for example, the following producing method.

Specifically, the copolymer can be produced by copolymerizing ethylene, a $C_4$-$C_{20}$ α-olefin, and a non-conjugated polyene in the presence of an olefin polymerization catalyst including (a-3) a transition metal compound (hereinafter may also be referred to as "bridged metallocene compound") represented by the undermentioned general formula [VII] and (b) at least one compound that is selected from the group consisting of (b-1) organometallic compounds, (b-2) organoaluminum oxy-compounds, and (b-3) compounds which react with the transition metal compound (a-3) to form an ion pair. When ethylene, a $C_4$ or more α-olefin, and a non-conjugated polyene are copolymerized in the presence of an olefin polymerization catalyst including the bridged metallocene compound, the advantage is obtained that the produced copolymer can have an even higher molecular weight.

[Chem. 1]

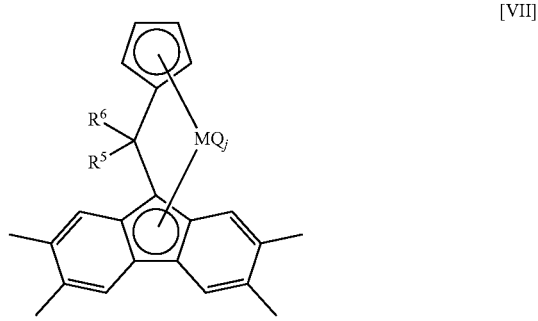

[VII]

M, $R^5$, $R^6$, Q, and j in the formula [VII] will be described below.

Y is an atom selected from the group consisting of a carbon atom, a silicon atom, a germanium atom, and a tin atom, and is preferably a carbon atom.

M is a titanium atom, a zirconium atom, or a hafnium atom, and is preferably a hafnium atom.

$R^5$ and $R^6$ are substituted aryl groups wherein one or more of the hydrogen atoms of the aryl group are substituted by an electron-donating substituent having a substituent constant σ of −0.2 or less in the Hammett's rule; wherein when the substituted aryl group has a plurality of the electron-donating substituents, each of the electron-donating substituents may be the same or different; wherein the substituted aryl group optionally have a substituent selected from the group consisting of $C_1$-$C_{20}$ hydrocarbon groups, silicon-containing groups, nitrogen-containing groups, oxygen-containing groups, halogen atoms, and halogen-containing groups other than the electron-donating substituents; and wherein when the substituted aryl group has a plurality of the substituents, each of the substituents may be the same or different (hereinafter referred to as "electron-donating-group-containing substituted aryl").

Examples of aryl groups include substituents derived from aromatic compounds, such as phenyl groups, 1-naphthyl groups, 2-naphthyl groups, anthracenyl groups, phenanthrenyl groups, tetracenyl groups, chrysenyl groups, pyrenyl groups, indenyl groups, azulenyl groups, pyrrolyl groups, pyridyl groups, furanyl groups, and thiophenyl groups, and the like. Among the aryl groups, phenyl groups or 2-naphthyl groups are preferable. Examples of the aromatic compounds include aromatic hydrocarbons and heterocyclic aromatic compounds, such as benzene, naphthalene, anthracene, phenanthrene, tetracene, chrysene, pyrene, pyrene, indene, azulene, pyrrole, pyridine, furan, and thiophene, and the like.

The electron-donating group having a substituent constant σ in the Hammett's rule of not more than −0.2 is defined and illustrated as follows. The Hammett's rule is a rule of thumb proposed by L. P. Hammett in 1935 in order to quantitatively discuss an influence of a substituent on a reaction or an equilibrium of a benzene derivative, and the validity of this rule is widely accepted today. As the substituent constant determined by the Hammett's rule, there are σp in the case of substitution at the para position of a benzene ring and σm in the case of substitution at the meta position of a benzene ring, and these values can be found in a large amount of general literature. For example, in the literature [Chem. Rev., 91, 165 (1991)] by Hansch and Taft, a detailed description of an extremely wide range of substituents has been made. However, values of σp and σm described in these literatures sometimes slightly vary depending upon the literature even in the case of the same substituents. In order to avoid confusion caused by such circumstances, the values described in Table 1 (pp. 168-175) of the literature [Chem. Rev., 91, 165 (1991)] by Hansch and Taft are defined as the substituent constants σp and σm of the Hammett's rule in the present invention, as long as the substituents are described. In the present invention, the electron-donating group having a substituent constant σ in the Hammett's rule of not more than −0.2 is an electron-donating group having σp of not more than −0.2 in the case where the electron-donating group substitutes at the para position (4-position) of a phenyl group, and is an electron-donating group having σm of not more than −0.2 in the case where the electron-donating group substitutes at the meta position (3-position) of a phenyl group. Further, in a case where the electron-donating group substitutes at the ortho position (2-position) of a phenyl group or in the case where it substitutes at an arbitrary position of an aryl group other than a phenyl group, the electron-donating group is an electron-donating group having σp of not more than −0.2.

Examples of the electron-donating substituents having a substituent constant σp or σm in the Hammett's rule of not more than −0.2 include nitrogen-containing groups, such as p-amino group (4-amino group), p-dimethylamino group (4-dimethylamino group), p-diethylamino group (4-diethylamino group) and M-diethylamino group (3-diethylamino group), oxygen-containing groups, such as p-methoxy group (4-methoxy group) and p-ethoxy group (4-ethoxy group), tertiary hydrocarbon groups, such as p-t-butyl group (4-t-butyl group), and silicon-containing groups, such as p-trimethylsiloxy group (4-trimethylsiloxy group). The electron-donating substituents defined in the present invention whose substituent constant σp or σm in the Hammett's rule is not more than −0.2 are not limited to the substituents described in Table 1 (pp. 168-175) of the literature [Chem. Rev., 91, 165 (1991)] by Hansch and Taft. Substituents whose substituent constant σp or σm measured based on the Hammett's rule will be within the above range are included in the electron-donating groups defined in the present invention whose substituent constant σp or σm in the Hammett's rule is not more than −0.2, even if the substituents are not described in the above literature. Examples of such substituents include p-N-morpholinyl group (4-N-morpholinyl group) and m-N-morpholinyl group (3-N-morpholinyl group).

When the electron-donating group-containing substituted aryl group is substituted by a plurality of electron-donating substituents, these electron-donating substituents may be the same as or different from each other, and the electron-donating group-containing substituted aryl group may be substituted not only by the electron-donating substituent but also by a substituent selected from the group consisting of a $C_1$-$C_{20}$ hydrocarbon group, a silicon-containing group, a nitrogen-containing group, an oxygen-containing group, a halogen atom, and a halogen-containing group, and when the electron-donating group-containing substituted aryl group is substituted by a plurality of the substituents, these substituents may be the same as or different from each other.

However, the total of the substituent constants σ in the Hammett's rule of the electron-donating substituent and the substituent contained in one substituted aryl group is preferably not more than −0.15. Examples of such substituted aryl groups include m,p-dimethoxyphenyl group (3,4-dimethoxyphenyl group), p-(dimethylamino)-m-methoxyphenyl group (4-(dimethylamino)-3-methoxyphenyl group), p-(dimethylamino)-m-methylphenyl group (4-(dimethylamino)-3-methylphenyl group), p-methoxy-m-methylphenyl group (4-methoxy-3-methylphenyl group), p-methoxy-m,m-dimethylphenyl group (4-methoxy-3,5-dimethylphenyl group), and the like.

Examples of $C_1$-$C_{20}$ hydrocarbon groups that the electron-donating-group-containing substituted aryl groups may contain include $C_1$-$C_{20}$ alkyl groups, $C_3$-$C_{20}$ cyclic saturated hydrocarbon groups, $C_2$-$C_{20}$ chain unsaturated hydrocarbon groups, and $C_3$-$C_{20}$ cyclic unsaturated hydrocarbon groups, and the like.

Examples of $C_1$-$C_{20}$ alkyl groups include straight-chain saturated hydrocarbon groups such as methyl groups, ethyl groups, n-propyl groups, n-butyl groups, n-pentyl groups, n-hexyl groups, n-heptyl groups, n-octyl groups, n-nonyl groups, an n-decanyl groups; branched saturated hydrocarbon groups such as isopropyl groups, isobutyl groups, s-butyl groups, t-butyl groups, t-amyl groups, neopentyl groups, 3-methyl pentyl groups, 1,1-diethyl propyl groups, 1,1-dimethyl butyl groups, 1-methyl-1-propyl butyl groups, 1,1-dipropyl butyl groups, 1,1-dimethyl-2-methyl propyl groups, 1-methyl-1-isopropyl-2-methyl propyl groups, cyclopropyl methyl groups, and the like. The alkyl groups preferably have 1 to 6 carbon atoms.

Examples of $C_3$-$C_{20}$ cyclic saturated hydrocarbon groups include unsubstituted cyclic saturated hydrocarbon groups such as cyclopropyl groups, cyclobutyl groups, cyclopentyl groups, cyclohexyl groups, cycloheptyl groups, cyclooctyl groups, norbornenyl groups, 1-adamantyl groups, and 2-adamantyl groups; groups wherein a hydrogen atom of an unsubstituted cyclic saturated hydrocarbon group is substituted by a $C_1$-$C_{17}$ hydrocarbon group, such as 3-methylcyclopentyl groups, 3-methylcyclohexyl groups, 4-methylcyclohexyl groups, 4-cyclohexyl cyclohexyl groups, and 4-phenyl cyclohexyl groups; and the like. The cyclic saturated hydrocarbon groups preferably have 5 to 11 carbon atoms.

Examples of $C_2$-$C_{20}$ chain unsaturated hydrocarbon groups include alkenyl groups such as ethenyl groups (vinyl groups) 1-propenyl groups, 2-propenyl groups (allyl groups), 1-methylethenyl groups (isopropenyl groups); and alkynyl groups such as ethynyl groups, 1-propynyl groups, and 2-propynyl groups (propargyl groups). The chain unsaturated hydrocarbon groups preferably have 2 to 4 carbon atoms.

Examples of $C_3$-$C_{20}$ cyclic unsaturated hydrocarbon groups include unsubstituted cyclic unsaturated hydrocarbon groups such as cyclopentadienyl groups, norbornyl groups, phenyl groups, naphthyl groups, indenyl groups, azulenyl groups, phenanthryl groups, and anthracenyl groups; groups wherein a hydrogen atom of an unsubstituted cyclic unsaturated hydrocarbon group is substituted by a $C_1$-$C_{15}$ hydrocarbon group, such as 3-methyl phenyl groups (m-tolyl groups), 4-methylphenyl groups (p-tolyl groups), 4-ethylphenyl groups, 4-t-butylphenyl groups, 4-cyclohexylphenyl groups, biphenylyl groups, 3,4-dimethylphenyl groups, 3,5-dimethylphenyl groups, and 2,4,6-trimethylphenyl groups (mesityl groups); groups wherein a hydrogen atom of a straight-chain hydrocarbon group or branched saturated hydrocarbon group is substituted by a $C_3$-$C_{19}$ cyclic saturated hydrocarbon group or cyclic unsaturated hydrocarbon group, such as benzyl groups and cumyl groups; and the like. The cyclic unsaturated hydrocarbon groups preferably have 6 to 10 carbon atoms.

Examples of silicon-containing groups that the electron-donating-group-containing substituted aryl groups may contain include alkylsilyl groups such as trimethylsilyl groups, triethylsilyl groups, t-butyldimethylsilyl groups, and triisopropylsilyl groups; arylsilyl groups such as dimethylphenylsilyl groups, methyldiphenylsilyl groups, and t-butyldiphenylsilyl groups; groups wherein a carbon atom is substituted by a silicon atom in a $C_1$-$C_{20}$ hydrocarbon group, such as pentamethyldisilanyl groups and trimethylsilylmethyl groups; and the like. The alkylsilyl groups preferably have 1 to 10 carbon atoms, and the arylsilyl groups preferably have 6 to 18 carbon atoms.

Examples of nitrogen-containing groups that the electron-donating-group-containing substituted aryl groups may contain include amino groups, nitro groups, and N-morpholinyl groups; and dimethylamino groups, diethylamino groups, dimethylaminomethyl groups, cyano groups, pyrrolidinyl groups, piperidinyl groups, and pyridinyl groups that are groups wherein, in the aforementioned $C_1$-$C_{20}$ hydrocarbon groups or silicon-containing groups, a =CH— structural unit is substituted by a nitrogen atom, a —CH$_2$— structural unit is substituted by a nitrogen atom to which a $C_1$-$C_{20}$ hydrocarbon group has been bonded, or a —CH$_3$ structural unit is substituted by a nitrogen atom or a nitrile group to which, in either case, a $C_1$-$C_{20}$ hydrocarbon group has been bonded. As the nitrogen-containing group, a dimethylamino group or an N-morpholinyl group is preferable.

Examples of oxygen-containing groups that the electron-donating-group-containing substituted aryl groups may contain include hydroxyl group; and methoxy group, ethoxy group, t-butoxy group, phenoxy group, trimethylsiloxy group, methoxyethoxy group, hydroxymethyl group, methoxymethyl group, ethoxymethyl group, t-butoxymethyl group, 1-hydroxyethyl group, 1-methoxyethyl group, 1-ethoxyethyl group, 2-hydroxyethyl group, 2-methoxyethyl group, 2-ethoxyethyl group, n-2-oxabutylene group, n-2-oxapentylene group, n-3-oxapentylene group, aldehyde group, acetyl group, propionyl group, benzoyl group, trimethylsilylcarbonyl group, carbamoyl group, methylaminocarbonyl group, carboxyl group, methoxycarbonyl group, carboxymethyl group, ethocarboxymethyl group, carbamoylmethyl group, furanyl group, and pyranyl group that are groups wherein in the aforementioned $C_1$-$C_{20}$ hydrocarbon groups, silicon-containing groups, or nitrogen-containing groups, a —CH$_2$— structural unit is substituted by an oxygen atom or a carbonyl group, or a —CH$_3$ structural unit is substituted by an oxygen atom to which a $C_1$-$C_{20}$ hydrocarbon group has been bonded. As the oxygen-containing group, a methoxy groups is preferable.

Examples of halogen atoms that the electron-donating-group-containing substituted aryl groups may contain include fluorine, chlorine, bromine and iodine that are Group 17 elements.

Examples of halogen-containing groups that the electron-donating-group-containing substituted aryl groups may contain include trifluoromethyl groups, tribromomethyl group, pentafluoroethyl group, and pentafluorophenyl group that are groups wherein in the aforementioned $C_1$-$C_{20}$ hydrocarbon groups, silicon-containing groups, nitrogen-containing groups, or oxygen-containing groups, a hydrogen atom is substituted by a halogen atom.

Q is an atom, substituent, or ligand selected from the group consisting of halogen atoms, $C_1$-$C_{20}$ hydrocarbon groups, anionic ligands, and neutral ligands capable of being coordinated with a lone electron pair, and when a plurality of Qs are present, they may be the same or different.

Specific examples of halogen atoms and $C_1$-$C_{20}$ hydrocarbon groups as Q are the same as the halogen atoms and $C_1$-$C_{20}$ hydrocarbon groups that the electron-donating-group-containing substituted aryl groups may contain. When Q is a halogen atom, it is preferably a chlorine atom. When Q is a $C_1$-$C_{20}$ hydrocarbon group, the hydrocarbon group preferably has 1 to 7 carbon atoms.

Examples of anionic ligands include alkoxy groups such as methoxy groups, t-butoxy groups, and phenoxy groups; carboxylate groups such as acetate and benzoate; sulfonate groups such as mesylate and tosylate; and the like.

Examples of neutral ligands capable of being coordinated with a lone electron pair include organophosphorus compounds such as trimethylphosphine, triethylphosphine, triphenylphosphine, and diphenylmethylphosphine; and ether compounds such as tetrahydrofuran, diethyl ether, dioxane, and 1,2-dimethoxyethane.

j is an integer of 1 to 4, and is preferably 2.

The 2,3,6,7-tetramethylfluorenyl group contained in the bridged metallocene compound (a) represented by the general formula [VII] has four substituents at its 2, 3, 6 and 7 position, hence having a large electronic effect, and it is inferred that this results in a high polymerization activity, causing an ethylene copolymer with a high molecular weight to be produced. Since a non-conjugated polyene is generally bulky compared with an α-olefin, it is inferred that especially when in a polymerization catalyst for polymerizing it, the vicinity of the central metal of a metallocene compound, which vicinity corresponds to a polymerization activity point, is less bulky, it leads to an increase in the copolymerization performance of the non-conjugated polyene. Because the four methyl groups contained in the 2,3,6,7-tetramethylfluorenyl group are not bulky compared with other hydrocarbon groups and the like, this is considered to contribute to a high non-conjugated polyene copolymerization performance. From the above, it is inferred that the bridged metallocene compound represented by the general formula [VII] including a 2,3,6,7-tetramethylfluorenyl group in particular achieves a high molecular weight of the produced ethylene copolymer, a high non-conjugated polyene copolymerization performance, and a high polymerization activity at a high level in a well-balanced manner at the same time.

The bridged metallocene compound (a-3) can be synthesized by a simple method such as the following formula [VIII].

[Chem. 2]

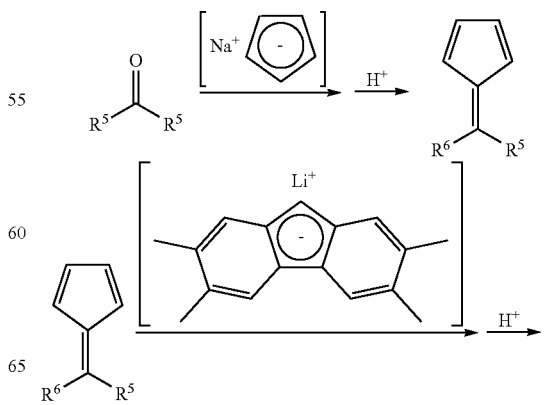

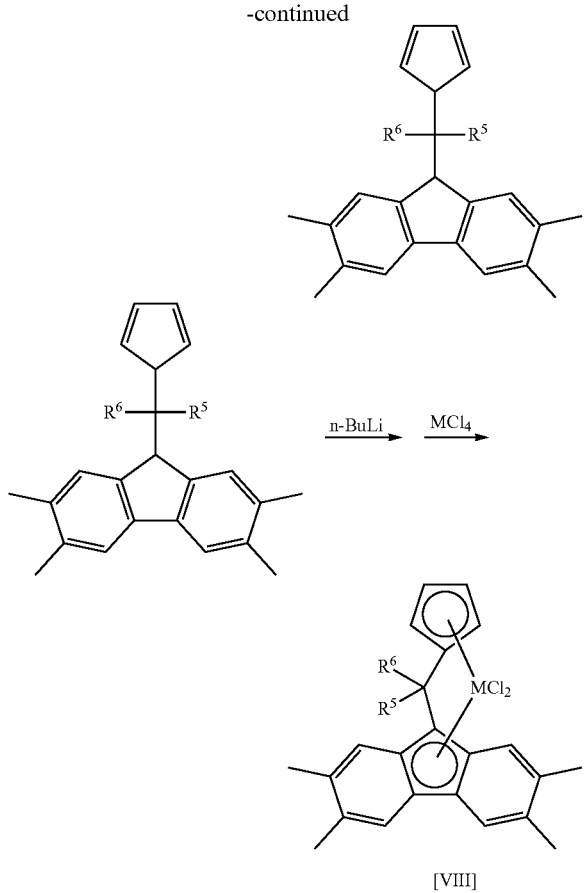

[VIII]

(wherein the definition, specific examples, and preferable examples of M, $R^5$ and $R^6$ are the same as in the formula [VII].)

In the formula [VIII], $R^5$ and $R^6$ are as aforementioned, and because various ketones which are represented by the general formula $R^5$—C(=O)—$R^6$ and which satisfy such conditions as these are commercially available from common reagent manufacturers, raw materials for the bridged metallocene compound (a-3) can be readily obtained. Even if such ketones are not commercially available, they can be easily synthesized by, for example, a method such as by Olah et al. [Heterocycles, 40, 79 (1995)]. Thus, the bridged metallocene compound (a-3) makes manufacturing processes relatively simple and easy and reduces production cost further, eventually providing the advantage that the use of this bridged metallocene compound reduces the production cost of the ethylene copolymer. Further, when ethylene, a $C_4$ or more α-olefin, and a non-conjugated polyene are copolymerized in the presence of an olefin polymerization catalyst including the bridged metallocene compound (a-3), the advantage is also obtained that the produced copolymer can have an even higher molecular weight.

In the bridged metallocene compound (a-3) represented by the general formula [VII], $R^5$ and $R^6$ are preferably groups selected from the group consisting of aryl groups and substituted aryl groups. When ethylene, a $C_4$ or more α-olefin, and a non-conjugated polyene are copolymerized in the presence of an olefin polymerization catalyst including the bridged metallocene compound, the advantages are obtained that the polymerization activity can further be enhanced and that the produced copolymer can have an even higher molecular weight. At the same time, the advantage is also obtained that the copolymerization performance of the non-conjugated polyene is enhanced (for example, the content of non-conjugated polyene units in the copolymer is increased, and the non-conjugated polyene units are more easily dispersed uniformly in the copolymer).

In the bridged metallocene compound (a-3) represented by the general formula [VII], $R^5$ and $R^6$ are further preferably the same groups. Selecting $R^5$ and $R^6$ in this manner simplifies synthesis processes for the bridged metallocene compound and further reduces production cost, eventually providing the advantage that using this bridged metallocene compound reduces the production cost of the copolymer. In addition, when ethylene, a $C_4$ or more α-olefin, and a non-conjugated polyene are copolymerized in the presence of an olefin polymerization catalyst including the bridged metallocene compound, the advantage is obtained that the produced copolymer can have an even higher molecular weight.

The applicant has intensively studied various bridged metallocene compounds (a) and consequently has found out for the first time that when $R^5$ and $R^6$ in the bridged metallocene compound (a-3) represented by the general formula [VII] are the aforementioned groups, the copolymerization of ethylene, a $C_4$ or more α-olefin, and a non-conjugated polyene in the presence of an olefin polymerization catalyst including the bridged metallocene compound (a-3) can make the molecular weight of the produced copolymer even higher.

It is known that in coordination polymerization of an olefin with an organometallic complex catalyst such as the bridged metallocene compound (a-3) according to the present invention, repeated polymerization of an olefin on the central metal of the catalyst propagates molecular chains of the produced olefin polymer (propagation), increasing the molecular weight of the olefin polymer. It is also known that in a reaction referred to as chain transfer, dissociation of molecular chains of an olefin polymer from the central metal of a catalyst stops propagation of the molecular chains and accordingly stops increase in the molecular weight of the olefin polymer. Thus, the molecular weight of an olefin polymer is characterized by the ratio of a frequency of propagation to a frequency of chain transfer reaction, which ratio is inherent to an organometallic complex catalyst that produces the polymer. In other words, the relation is such that the larger the ratio of the frequency of propagation to the frequency of chain transfer reaction is, the higher the molecular weight of the produced olefin polymer is, and conversely, the smaller the former, the lower the latter. Here, the frequencies of the respective reactions can be estimated from the activation energies of the respective reactions, and it can be considered that a reaction having a low activation energy is more frequent and that conversely a reaction having a high activation energy is less frequent. It is known that in general a frequency of propagation in olefin polymerization is sufficiently high compared with a frequency of chain transfer reaction, i.e., an activation energy of propagation is sufficiently low compared with an activation energy of chain transfer reaction. Thus, a value (hereinafter referred to as "ΔEc") obtained by subtracting an activation energy of propagation from an activation energy of chain transfer reaction is positive, and it is inferred that the larger the value is, the larger the frequency of propagation is compared with the frequency of chain transfer reaction and the larger the molecular weight of the produced olefin polymer produced is. The adequacy of estimation thus conducted of a molecular weight of an olefin polymer is endorsed by the calculation results of, for example, Laine et al. [Organometallics, 30, 1350 (2011)]. It is inferred that when $R^5$ and $R^6$ in the bridged metallocene compound (a-3) represented by the general formula [VII] are electron-donating group-containing substituted aryl groups wherein in particular one or more electron-donating substituents having a substituent constant σ of −0.2 or less in the Hammett's rule are substituted, the ΔEc increases and that in copolymerization of ethylene, a $C_4$ or more α-olefin, and a non-conjugated polyene in the presence of an olefin polymerization catalyst including the bridged metallocene compound (a-3), the produced copolymer has a high molecular weight.

In the bridged metallocene compound (a-3) represented by the general formula [VII], electron-donating substituents contained in $R^5$ and $R^6$ are preferably groups selected from the group consisting of nitrogen-containing groups and oxygen-containing groups.

In the bridged metallocene compound (a-3) represented by the general formula [VII], $R^5$ and $R^6$ are further preferably substituted phenyl groups containing groups selected from the group consisting of nitrogen-containing groups and oxygen-containing groups as the electron-donating substituents. For synthesis by a method such as, for example, the formula [VIII], various benzophenones as raw materials are commercially available from common reagent manufacturers, so that the raw materials are readily obtained, production processes are simplified, and furthermore production cost is reduced, eventually providing the advantage that using this bridged metallocene compound reduces the production cost of the copolymer (B).

Here, examples of substituted phenyl groups containing groups selected from the group consisting of nitrogen-containing groups or oxygen-containing groups as the electron-donating substituent include: o-aminophenyl group (2-aminophenyl group), p-aminophenyl group (4-aminophenyl group), o-(dimethylamino)phenyl group (2-(dimethylamino)phenyl group), p-(dimethylamino)phenyl group (4-(dimethylamino)phenyl group), o-(diethylamino)phenyl group (2-(diethylamino)phenyl group), p-(diethylamino) phenyl group (4-(diethylamino)phenyl group), m-(diethylamino)phenyl group (3-(diethylamino)phenyl group), o-methoxyphenyl group (2-methoxyphenyl group), p-methoxyphenyl group (4-methoxyphenyl group), o-ethoxyphenyl group (2-ethoxyphenyl group), p-ethoxyphenyl group (4-ethoxyphenyl group), o-N-morpholinylphenyl group (2-N-morpholinylphenyl group), p-N-morpholinylphenyl group (4-N-morpholinylphenyl group), m-N-morpholinylphenyl group (3-N-morpholinylphenyl group), o,p-dimethoxyphenyl group (2,4-dimethoxyphenyl group), m,p-dimethoxyphenyl group (3,4-dimethoxyphenyl group), p-(dimethylamino)-m-methoxyphenyl group (4-(dimethylamino)-3-methoxyphenyl group), p-(dimethylamino)-m-methylphenyl group (4-(dimethylamino)-3-methylphenyl group), p-methoxy-m-methylphenyl group (4-methoxy-3-methylphenyl group), p-methoxy-m,m-dimethylphenyl group (4-methoxy-3,5-dimethylphenyl group).

In the bridged metallocene compound (a-3) represented by the general formula [VII], $R^5$ and $R^6$ are further preferably substituted phenyl groups wherein groups selected from the group consisting of nitrogen-containing groups and oxygen-containing groups as the electron-donating substituents are contained for the meta and/or para positions for bonding to a carbon atom as the aforementioned Y. Synthesis by a method such as, for example, the formula [VIII] is easier compared with synthesis wherein the group is substituted in the ortho position, whereby manufacturing processes are simplified, and furthermore production cost is reduced, eventually providing the advantage that using this bridged metallocene compound reduces the production cost of the ethylene copolymer.

When, in the bridged metallocene compound (a-3) represented by the general formula [VII], $R^5$ and $R^6$ are substituted phenyl groups wherein nitrogen-containing groups as the electron-donating substituents are contained for the meta and/or para positions for bonding to a carbon atom as the aforementioned Y, the nitrogen-containing groups are further preferably groups represented by the following general formula [II].

[Chem. 3]

[II]

(wherein $R^7$ and $R^8$, each of which may be the same or different and may be bound together to form a ring, are atoms or substituents selected from the group consisting of hydrogen atoms, $C_1$-$C_{20}$ hydrocarbon groups, silicon-containing groups, oxygen-containing groups and halogen-containing groups; and the line on the right of N represents a bond to a phenyl group.)

The specific examples and preferred examples of $C_1$-$C_{20}$ hydrocarbon groups, silicon-containing groups, oxygen-containing groups, and halogen containing groups as $R^7$ and $R^8$ are the same as in the formula [VII].

Such a bridged metallocene compound (a-4) is represented by the following general formula [IX].

[Chem. 4]

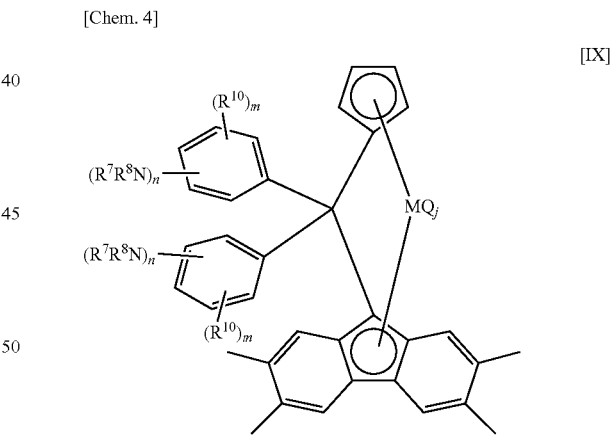

[IX]

(wherein the definition, specific examples, and preferable examples of M, Q, and j are the same as in the formula [VII].) $R^7$, $R^8$ and $R^{10}$, each of which may be the same or different, are substituents selected from the group consisting of hydrogen atoms, $C_1$-$C_{20}$ hydrocarbon groups, silicon-containing groups, nitrogen-containing groups, oxygen-containing groups, halogen atoms and halogen-containing groups; adjacent substituents among $R^7$, $R^8$, and $R^{10}$ may be bound together to form a ring; $NR^7R^8$ is a nitrogen-containing group having a substituent constant σ of −0.2 or less in the Hammett's rule; when a plurality of the nitrogen-containing groups are present, each of the nitrogen-containing groups may be the same or different; n is an integer of 1 to 3; and m is an integer of 0 to 4.)

When, in the bridged metallocene compound (a-3) represented by the general formula [VII], $R^5$ and $R^6$ are substituted phenyl groups wherein oxygen-containing groups as the electron-donating substituents are contained for the meta and/or para positions for bonding to a carbon atom as the aforementioned Y, the oxygen-containing groups are further preferably groups represented by the following general formula [III].

[Chem. 5]

$R^9$—O—                 [III]

(wherein $R^9$ is an atom or a substituent selected from the group consisting of hydrogen atoms, $C_1$-$C_{20}$ hydrocarbon groups, silicon-containing groups, nitrogen-containing groups and halogen-containing groups; and the line drawn on the right of O represents a bond to a phenyl group.)

The specific examples and preferred examples of $C_1$-$C_{20}$ hydrocarbon groups, silicon-containing groups, nitrogen-containing groups and halogen-containing groups as $R^9$ are the same as in the formula [VII]. Such a bridged metallocene compound (a-5) is represented by the following general formula [X].

[Chem. 6]

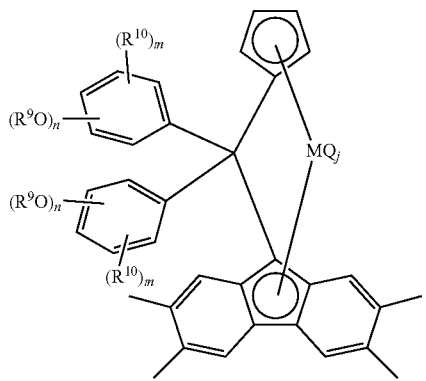

[X]

(wherein the definition, specific examples, and preferable examples of M, Q and j are the same as in the formula [VII]. $R^9$ and $R^{10}$, each of which may be the same or different, are atoms or substituents selected from the group consisting of hydrogen atoms, $C_1$-$C_{20}$ hydrocarbon groups, silicon-containing groups, nitrogen-containing groups, oxygen-containing groups, halogen atoms and halogen-containing groups; adjacent substituents of $R^{10}$ may be bound together to form a ring; $OR^9$ is an oxygen-containing group having a substituent constant σ of −0.2 or less in the Hammett's rule; when a plurality of the oxygen-containing groups are present, each of the oxygen-containing groups may be the same or different; n is an integer of 1 to 3; and m is an integer of 0 to 4.)

It is more preferred that N is a hafnium atom in the bridged metallocene compound (a-3) according to the present invention represented by the general formula [VII], the bridged metallocene compound (a-4) according to the present invention represented by the general formula [IX], and the bridged metallocene compound (a-5) according to the present invention represented by the general formula [X]. When ethylene, a $C_4$ or more α-olefin, and a non-conjugated polyene are copolymerized in the presence of an olefin polymerization catalyst including the bridged metallocene compound wherein M is a hafnium atom, the produced copolymer can have an even higher molecular weight, providing the advantage that the copolymerization performance of the non-conjugated polyene is enhanced.

Examples of such bridged metallocene compounds (a) include:

[dimethylmethylene($\eta^5$-cyclopentadienyl)($\eta^5$-2,3,6,7-tetramethylfluorenyl)]hafnium dichloride, diethylmethylene ($\eta^5$-cyclopentadienyl)($\eta^5$-2,3,6,7-tetramethylfluorenyl)] hafnium dichloride, [di-n-butylmethylene($\eta^5$-cyclopentadienyl)($\eta^5$-2,3,6,7-tetramethylfluorenyl)] hafnium dichloride, [dicyclopentylmethylene($\eta^5$-cyclopentadienyl)($\eta^5$-3,6,7-tetramethylfluorenyl)]hafnium dichloride, [dicyclohexylmethylene($\eta^5$-cyclopentadienyl) ($\eta^5$-2,3,6,7-tetramethylfluorenyl)]hafnium dichloride,

[cyclopentylidene($\eta^5$-cyclopentadienyl)($\eta^5$-2,3,6,7-tetramethylfluorenyl)]hafnium dichloride, [cyclohexylidene ($\eta^5$-cyclopentadienyl)($\eta^5$-2,3,6,7-tetramethylfluorenyl)] hafnium dichloride,

[diphenylmethylene($\eta^5$-cyclopentadienyl)($\eta^5$-2,3,6,7-tetramethylfluorenyl)]hafnium dichloride, [di-1-naphthylmethylene($\eta^5$-cyclopentadienyl)($\eta^5$-3,6,7-tetramethylfluorenyl)]hafnium dichloride, [di-2-naphthylmethylene($\eta^5$-cyclopentadienyl)($\eta^5$-2,3,6,7-tetramethylfluorenyl)] hafnium dichloride,

[bis(3-methylphenyl)methylene($\eta^5$-cyclopentadienyl) ($\eta^5$-2,3,6,7-tetramethylfluorenyl)]hafnium dichloride, [bis (4-methylphenyl)methylene($\eta^5$-cyclopentadienyl)($\eta^5$-2,3,6,7-tetramethylfluorenyl)]hafnium dichloride, [bis(3,4-dimethylphenyl)methylene($\eta^5$-cyclopentadienyl)($\eta^5$-2,3,6,7-tetramethylfluorenyl)]hafnium dichloride, [bis(4-n-hexylphenyl)methylene($\eta^5$-cyclopentadienyl)($\eta^5$-2,3,6,7-tetramethylfluorenyl)]hafnium dichloride, [bis(4-cyclohexylphenyl)methylene($\eta^5$-cyclopentadienyl)($\eta^5$-2,3,6,7-tetramethylfluorenyl)]hafnium dichloride, [bis(4-t-butylphenyl)methylene($\eta^5$-cyclopentadienyl)($\eta^5$-2,3,6,7-tetramethylfluorenyl)]hafnium dichloride,

[bis(3-methoxyphenyl)methylene($\eta^5$-cyclopentadienyl) ($\eta^5$-2,3,6,7-tetramethylfluorenyl)]hafnium dichloride, [bis (4-methoxyphenyl)methylene($\eta^5$-cyclopentadienyl)($\eta^5$-2,3,6,7-tetramethylfluorenyl)]hafnium dichloride, [bis(3,4-dimethoxyphenyl)methylene($\eta^5$-cyclopentadienyl)($\eta^5$-2,3,6,7-tetramethylfluorenyl)]hafnium dichloride, [bis(4-methoxy-3-methylphenyl)methylene($\eta^5$-cyclopentadienyl) ($\eta^5$-2,3,6,7-tetramethylfluorenyl)]hafnium dichloride, [bis (4-methoxy-3,4-dimethylphenyl)methylene($\eta^5$-cyclopentadienyl)($\eta^5$-2,3,6,7-tetramethylfluorenyl)] hafnium dichloride, [bis(4-ethoxyphenyl)methylene($\eta^5$-cyclopentadienyl)($\eta^5$-2,3,6,7-tetramethylfluorenyl)] hafnium dichloride, [bis(4-phenoxyphenyl)methylene($\eta^5$-cyclopentadienyl)($\eta^5$-2,3,6,7-tetramethylfluorenyl)] hafnium dichloride, [bis {4-(trimethylsiloxy)phenyl}methylene($\eta^5$-cyclopentadienyl)($\eta^5$-2,3,6,7-tetramethylfluorenyl)]hafnium dichloride,

[bis {3-(dimethylamino)phenyl}methylene($\eta^5$-cyclopentadienyl)($\eta^5$-2,3,6,7-tetramethylfluorenyl)]hafnium dichloride, [bis{4-(dimethylamino)phenyl}methylene($\eta^5$-cyclopentadienyl)($\eta^5$-2,3,6,7-tetramethylfluorenyl)]hafnium dichloride, [bis(4-morpholinylphenyl)($\eta^5$-cyclopentadienyl) ($\eta^5$-2,3,6,7-tetramethylfluorenyl)]hafnium dichloride,

[bis {4-(trimethylsilyl)phenyl}methylene($\eta^5$-cyclopentadienyl)($\eta^5$-2,3,6,7-tetramethylfluorenyl)]hafnium dichloride,

[bis(3-chlorophenyl)methylene($\eta^5$-cyclopentadienyl)($\eta^5$-2,3,6,7-tetramethylfluorenyl)]hafnium dichloride, [bis(4- chlorophenyl)methylene($\eta^5$-cyclopentadienyl)($\eta^5$-2,3,6,7-tetramethylfluorenyl)]hafnium dichloride, [bis(3-fluorophenyl)methylene($\eta^5$-cyclopentadienyl)($\eta^5$-2,3,6,7-tetramethylfluorenyl)]hafnium dichloride, [bis(4-fluorophenyl)methylene($\eta^5$-cyclopentadienyl)($\eta^5$-2,3,6,7-tetramethylfluorenyl)]hafnium dichloride, [bis{3-(trifluoromethyl)phenyl}methylene($\eta^5$-cyclopentadienyl)($\eta^5$-2,3,6,7-tetramethylfluorenyl)]hafnium dichloride, [bis{4-(trifluoromethyl)phenyl}methylene($\eta^5$-cyclopentadienyl)($\eta^5$-2,3,6,7-tetramethylfluorenyl)]hafnium dichloride,

[methylphenylmethylene($\eta^5$-cyclopentadienyl)($\eta^5$-2,3,6,7-tetramethylfluorenyl)]hafnium dichloride, [methyl(4-methylphenyl)methylene($\eta^5$-cyclopentadienyl)($\eta^5$-2,3,6,7-tetramethylfluorenyl)]hafnium dichloride, [methyl(4-methoxyphenyl)methylene($\eta^5$-cyclopentadienyl)($\eta^5$-2,3,6,7-tetramethylfluorenyl)]hafnium dichloride, [methyl{4-(dimethylamino)phenyl}methylene($\eta^5$-cyclopentadienyl)($\eta^5$-2,3,6,7-tetramethylfluorenyl)]hafnium dichloride, [methyl(4-N-morpholinylphenyl)methylene($\eta^5$-cyclopentadienyl)($\eta^5$-2,3,6,7-tetramethylfluorenyl)]hafnium dichloride,

[dimethylsilylene($\eta^5$-cyclopentadienyl)($\eta^5$-2,3,6,7-tetramethylfluorenyl)]hafnium dichloride, [diethylsilylene($\eta^5$-cyclopentadienyl)($\eta^5$-2,3,6,7-tetramethylfluorenyl)] hafnium dichloride, [dicyclohexylsilylene($\eta^5$-cyclopentadienyl)($\eta^5$-2,3,6,7-tetramethylfluorenyl)] hafnium dichloride, [diphenylsilylene($\eta^5$-cyclopentadienyl)($\eta^5$-2,3,6,7-tetramethylfluorenyl)]hafnium dichloride, [di(4-methylphenyl)silylene($\eta^5$-cyclopentadienyl)($\eta^5$-2,3,6,7-tetramethylfluorenyl)]hafnium dichloride,

[dimethylgermylene($\eta^5$-cyclopentadienyl)($\eta^5$-2,3,6,7-tetramethylfluorenyl)]hafnium dichloride, [diphenylgermylene($\eta^5$-cyclopentadienyl)($\eta^5$-2,3,6,7-tetramethylfluorenyl)]hafnium dichloride,

[1-($\eta^5$-cyclopentadienyl)-2-($\eta^5$-2,3,6,7-tetramethylfluorenyl)ethylene]hafnium dichloride, [1-($\eta^5$-cyclopentadienyl)-3-($\eta^5$-2,3,6,7-tetramethylfluorenyl)propylene]hafnium dichloride, [1-($\eta^5$-cyclopentadienyl)-2-($\eta^5$-2,3,6,7-tetramethylfluorenyl)-1,1,2,2-tetramethylsilylene]hafnium dichloride, [1-($\eta^5$-cyclopentadienyl)-2-($\eta^5$-2,3,6,7-tetramethylfluorenyl)phenylene]hafnium dichloride; compounds wherein the hafnium atom of these compounds is substituted by a zirconium atom, or compounds wherein the chloro-ligand is substituted by a methyl group; and the like. Among these catalysts, [bis(4-methylphenyl)methylene($\eta^5$-cyclopentadienyl)($\eta^5$-2,3,6,7-tetramethylfluorenyl)]hafnium dichloride is preferable.

Bridged metallocene compounds used in producing the above copolymer (B) can be produced by a known method, and are not limited to a particular producing method. Examples of producing methods include J. Organomet. Chem., 63, 509(1996) and the publications according to the applications filed by the present applicant: WO2006/123759, WO01/27124, JP-A No. 2004-168744, JP-A No. 2004-175759, JP-A No. 2000-212194, and the like.

Next, a preferred embodiment wherein the bridged metallocene compound is used as a catalyst (olefin polymerization catalyst) for producing an ethylene.αolefin.non-conjugated polyene copolymer (B) will be described.

When the bridged metallocene compound is used as an olefin polymerization catalyst component, the catalyst includes
(a) a bridged metallocene compound represented by the general formula [VII],
(b) at least one compound that is selected from the group consisting of (b-1) organometallic compounds, (b-2) organoaluminum oxy-compounds and (b-3) compounds which react with the bridged metallocene compound (a) to form an ion pair, and, if necessary,
(c) a particulate carrier.

Each component will be specifically described below.

<(b-1) Organometallic Compound>

As a (b-1) organometallic compound used for producing the copolymer (B), specifically an organometallic compound in Group 1, 2, 12, and 13 of the periodic table, such as the following general formulae [X] to [XII], is used.

(b-1a) Organoaluminum compound represented by General Formula

$$R^a_m Al(OR^b)_n H_p X_q \qquad [X]$$

(wherein $R^a$ and $R^b$, each of which may be the same or different, represent a $C_1$-$C_{15}$, preferably $C_1$-$C_4$ hydrocarbon group; X represents a halogen atom; m, n, p, and q are numbers defined as 0<m≤3, 0≤n<3, 0≤p<3, 0≤q<3, and m+n+p+q=3.)

Examples of compounds represented by the general formula [X] include trialkylaluminum such as trimethylaluminum, triethylaluminum, triisobutylaluminum, and tri-n-octylaluminum; tricycloalkylaluminum, isobutylaluminum dichloride, diethylaluminum chloride, ethylaluminum dichloride, ethylaluminumsesqui chloride, methylaluminum dichloride, dimethylaluminum chloride, and diisobutylaluminumhydride.

(b-1b) Complex alkylated compound of a metal of Group 1 of the periodic table and aluminum, represented by General Formula

$$M^2 AlR^a_4 \qquad [XI]$$

(wherein $M^2$ represents Li, Na, or K, and $R^a$ is a $C_1$-$C_{15}$, preferably $C_1$-$C_4$ hydrocarbon group.)

Examples of compounds represented by the general formulas [XI] include LiAl($C_2H_5$)$_4$ and LiAl($C_7H_{15}$)$_4$.

(b-1c) Dialkyl compound having a metal of Group 2 or 12 of the periodic table, represented by General Formula

$$R^a R^b M^3 \qquad [XII]$$

(wherein $R^a$ and $R^b$, each of which may be the same or different, represent a $C_1$-$C_{15}$, preferably $C_1$-$C_4$ hydrocarbon group, and $M^3$ is Mg, Zn, or Cd.)

Among the organometallic compounds (b-1), organoaluminum compounds such as triethylaluminum, triisobutylaluminum and trin-octylaluminum are preferable. These organometallic compounds (b-1) may be used singly or in combination of two or more kinds.

<(b-2) Organoaluminum Oxy-Compound>

The (b-2) organoaluminum oxy-compound used in producing the copolymer (B) may be a conventionally known aluminoxane and may be a benzene-insoluble organoaluminum oxy-compound such as exemplified in JP-A No. H02-78687. The (b-2) organoaluminum oxy-compound is used singly or in combination of two or more kinds thereof.

<(b-3) Compound which Reacts with Transition Metal Compound (a) to Form Ion Pair>

Examples of the compound (b-3) (hereinafter referred to as "ionized ionic compound") which reacts with the bridged metallocene compound (a) used in producing the copolymer (B) to form an ion pair include Lewis acids, ionic compounds, borane compounds, and carborane compounds described in JP-A No. H01-501950, JP-A No. H01-502036, JP-A No. H03-179005, JP-A No. H03-179006, JP-A No. H03-207703, JP-A No. H03-207704, U.S. Pat. No. 5,321,106, and the like. Further examples also include heteropoly compounds and isopoly compounds.

Among the (b-3) ionized ionic compounds, triphenylcarbeniumtetrakis(pentafluorophenyl)borate and N,N-dimethylaniliniumtetrakis(pentafluorophenyl)borate are preferable. The (b-3) ionized ionic compound is used singly or in combination of two or more kinds thereof.

When the catalyst is the transition metal compound (a) represented by the general formula [VII], using it together with the organometallic compound (b-1) such as triisobutylaluminum, the organoaluminum oxy-compound (b-2) such as methylaluminoxane or the ionized ionic compound (b-3) such as triphenylcarbeniumtetrakis(pentafluorophenyl)borate presents a very high polymerization activity in manufacturing an ethylene.α-olefin.non-conjugated polyene copolymer (B).

For the olefin polymerization catalyst used in producing the copolymer (B), the carrier (c) can be used, if necessary, together with the transition metal compound (a) and at least one compound (b) selected from the group consisting of (b-1) organometallic compounds, (b-2) organoaluminum oxy-compounds, and (b-3) ionized ionic compounds.

The (c) carrier is an inorganic compound or an organic compound, and is a granular or particulate solid.

Among the inorganic compounds, porous oxide, inorganic halide, clay, clay mineral, or an ion-exchanging layered compound is preferable.

Examples of porous oxides include porous materials whose main component is an inorganic oxide such as $SiO_2$, $Al_2O_3$, $MgO$, $ZrO$, $TiO_2$, $B_2O_3$, $CaO$, $ZnO$, $BaO$, or $ThO_2$; or a complex or mixture including these inorganic oxides; and examples of porous oxides specifically include natural or synthetic zeolites; porous oxides whose main component is $SiO_2$—$MgO$, $SiO_2$—$Al_2O_3$, $SiO_2$—$TiO_2$, $SiO_2$—$V_2O_5$, $SiO_2$—$Cr_2O_3$, or $SiO_2$—$TiO_2$—$MgO$. Among these, porous oxides whose main component is $SiO_2$ and/or $Al_2O_3$ are preferable. While such porous oxides have different characteristics depending on their type and manufacturing method, a carrier preferably used in the present invention has a particle size of 10 to 300 μm, preferably 20 to 200 μm, a specific surface area within the range of usually 50 to 1000 $m^2/g$, preferably 100 to 700 $m^2/g$, and a pore volume preferably within the range of 0.3 to 3.0 $cm^3/g$. Such a carrier is used after it is calcined at 100 to 1000° C., preferably 150 to 700° C., when needed.

Examples of inorganic halides include $MgCl_2$, $MgBr_2$, $MnCl_2$, and $MnBr_2$. The inorganic halide may be used as it is, or may be used after being pulverized using a ball mill or an oscillating mill. An inorganic halide dissolved in a solvent such as alcohol and then precipitated out as fine particles using a precipitation agent can also be used.

Clay used as the carrier (c) is usually composed with a clay mineral as a main component. An ion-exchanging layered compound used in the present invention is a compound having a crystalline structure wherein planes structured by ionic bonding and the like are stacked in parallel by a mutual weak bonding force, and the contained ions can be exchanged. Most clay minerals are ion-exchanging layered compounds. As such clay, clay minerals or ion-exchanging layered compounds, not only naturally occurring ones but also artificially synthesized ones can be used.

Examples of clay, clay minerals, and ion-exchanging layered compounds include ionic crystalline compounds having clay or clay minerals or having a layered crystalline structure of a hexagonal close-packed type, antimony type, $CdCl_2$ type, $CdI_2$ type, or the like.

Examples of such clay and clay minerals include kaolin, bentonite, kibushi clay, gairome clay, allophane, hisingerite, pyrophyllite, micas, montmorillonites, vermiculite, chlorites, palygorskite, kaolinite, nacrite, dickite, halloysite, and the like.

Examples of ion-exchanging layered compounds include a crystalline acid salt of a polyvalent metal such as α-Zr $(HAsO_4)_2.H_2O$, α-Zr$(HPO_4)_2$, α-Zr$(KPO_4)_2.3H_2O$, α-Ti $(HPO_4)_2$, α-Ti$(HAsO_4)_2.H_2O$, α-Sn$(HPO_4)_2.H_2O$, γ-Zr $(HPO_4)_2$, γ-Ti$(HPO_4)_2$ and γ-Ti$(NH_4PO_4)_2.H_2O$, and the like.

For such clay, clay minerals and ion-exchanging layered compounds, a pore volume of pores having a radius of 20 Å or more is preferably 0.1 cc/g or more, particularly preferably 0.3 to 5 cc/g, as measured by a mercury penetration method. Here, the pore volume is measured for the pore radius in the range of 20 to 30000 Å by a mercury penetration method using a mercury porosimeter.

When that which has less than 0.1 cc/g pore volume of pores having a radius of 20 Å or more is used as a carrier, it tends to be difficult to obtain a high polymerization activity.

It is preferable to subject the clays and the clay minerals used as the carrier (c) to chemical treatment. Examples of chemical treatments include a surface treatment for removing impurities stuck on a surface, a treatment for giving effect on the crystalline structure of clay, and the like, any of which can be used. Examples of chemical treatments specifically include acid treatment, alkali treatment, salt treatment, organic matter treatment and the like. Acid treatment not only removes impurities on a surface but also increases the surface area by eluting positive ions of Al, Fe, Mg and the like out of the crystalline structure. Alkali treatment destroys the crystalline structure of clay and results in a change in the structure of clay. Salt treatment or organic matter treatment forms ion complexes, molecular complexes, organic derivatives or the like and can change the surface area or interlayer distance.

The ion-exchanging layered compound used as the carrier (c) may be a layered compound wherein spacing between layers has been enlarged by exchanging exchangeable ions present between layers with other large bulky ions. Such a bulky ion plays a pillar-like role to support a layer structure and is usually called pillar. Introduction of another substance between layers of a layered compound as above is referred to as "intercalation". Examples of guest compounds for intercalation include cationic inorganic compounds, such as $TiCl_4$ and $ZrCl_4$, metallic alkoxides, such as $Ti(OR)_4$, $Zr(OR)_4$, $PO(OR)_3$ and $B(OR)_3$ (R is a hydrocarbon group or the like), and metallic hydroxide ions, such as $[Al_{13}O_4 (OH)_{24}]^{7+}$, $[Zr_4 (OH)_{14}]^{2+}$ and $[Fe_3O(OCOCH_3)_6]^4$. These compounds may be used singly or in combination of two or more kinds thereof. During intercalation of these compounds, polymerization products obtained by subjecting metallic alkoxides such as $Si(OR)_4$, $Al(OR)_3$ and $Ge(OR)_4$ (R is a hydrocarbon group or the like) to hydrolysis, colloidal inorganic compounds such as $SiO_2$, etc. may be allowed to coexist. As the pillar, an oxide formed by intercalating the above metallic hydroxide ion between layers and then performing thermal dehydration, or the like can be mentioned.

The clay, clay mineral, or ion-exchanging layered compound may be used as it is, or may be used after undergoing a treatment such as ball milling or screening. It may be used after being allowed to adsorb water freshly added to it or undergoing a heating dewatering treatment. These substances as the carrier (c) may be used singly or in combination of two or more kinds thereof.

Among these, a preferable one is clay or a clay mineral, and particularly preferable ones are montmorillonite, vermiculite, hectorite, taeniolite and synthetic mica.

Examples of the organic compounds include a granular or particulate solid having a particle size in the range of 10 to 300 μm. Specifically, examples thereof include (co)polymers produced with a $C_2$-$C_{14}$ α-olefin such as ethylene, propylene, 1-butene, or 4-methyl-1-pentene as a main component, (co)polymers produced with vinylcyclohexane or styrene as a main component, and modified products thereof.

The olefin polymerization catalyst used in producing the copolymer (B) can contain the bridged metallocene compound (a), at least one compound (b) selected from the group consisting of (b-1) organometallic compounds, (b-2) organoaluminum oxy-compounds, and (b-3) ionized ionic compounds, and the carrier (c) that is used if necessary.

In copolymerizing ethylene, an α-olefin, and a non-conjugated polyene, usage and addition order of each component making up the polymerization catalyst are selected as desired, and the following methods are exemplified.

(1) A method of adding the compound (a) singly to a polymerization reactor (2) A method of adding the compound (a) and the compound (b) to a polymerization reactor in optional order (3) A method of adding a catalyst component, which has the compound (a) supported on the carrier (c), and the compound (b) to a polymerization reactor in optional order (4) A method of adding a catalyst component, which has the compound (b) supported on the carrier (c), and the compound (a) to a polymerization reactor in optional order (5) A method of adding a catalyst component, which has the compound (a) and the compound (b) supported on the carrier (c), to a polymerization reactor In each of the methods (2) to (5), at least two of the compound (a), the compound (b) and the carrier (c) may be put in contact preliminarily.

In each of the methods (4) and (5), wherein a compound (b) is supported, another compound (b) which is not supported may be added in optional order, if necessary. In this case, this compound (b) may be the same as or different from the compound (b) supported on the carrier (c).

A solid catalyst component having the compound (a) supported on the carrier (c) or a solid catalyst component having the compound (a) and the compound (b) supported on the carrier (c) may have an olefin polymerized preliminarily and may further have a catalyst component supported on the preliminarily polymerized solid catalyst component.

The copolymer (B) can be manufactured by copolymerizing ethylene, an α-olefin, and a non-conjugated polyene in the presence of a catalyst, such as aforementioned, for an ethylene.α-olefin.non-conjugated polyene copolymer.

The copolymer (B) can be manufactured by either of a liquid phase polymerization method such as solution (dissolution) polymerization or suspension polymerization or a gas phase polymerization method.

Examples of inactive hydrocarbon media used in a liquid phase polymerization method include aliphatic hydrocarbons such as propane, butane, pentane, hexane, heptane, octane, decane, dodecane, and kerosene; alicyclic hydrocarbons such as cyclopentane, cyclohexane and methylcyolopentane; aromatic hydrocarbons such as benzene, toluene and xylene; and halogenated hydrocarbons such as ethylene chloride, chlorobenzene, and dichloromethane. The inactive hydrocarbon media may be used singly or in combination of two or more kinds thereof. An olefin itself can also be used as a solvent.

In polymerizing ethylene or the like using such a catalyst for copolymers as is aforementioned, the bridged metallocene compound (a) is used in an amount to make up usually $10^{-12}$ to $10^{-2}$ mol, preferably $10^{-10}$ to $10^{-8}$ mol per liter of reaction volume.

The organometallic compound (b-1) is used in an amount such that the molar ratio [(b-1)/M] of the compound (b-1) to all transition metal atoms (M) in the bridged metallocene compound (a) is usually 0.01 to 50000, preferably 0.05 to 10000. The organoaluminum oxy-compound (b-2) is used in an amount such that the molar ratio [(b-2)/M] of aluminum atoms in the compound (b-2) to all transition metals (M) in the compound (a) is usually 10 to 50000, preferably 20 to 10000. The ionized ionic compound (b-3) is used in an amount such that the molar ratio [(b-3)/M] of the compound (b-3) to transition metal atoms (M) in the compound (a) is usually 1 to 20, preferably 1 to 15.

The polymerization temperature of the copolymer (B) is usually −50 to +200° C., preferably in the range of 0 to +200° C., more preferably in the range of +80 to +200° C.

The polymerization temperature is desirably a higher temperature (+80° C. or more) in view of productivity, although it depends on the target molecular weight be achieved and the polymerization activity of a catalyst used.

The polymerization pressure of the copolymer (B) is in the range of usually a normal pressure to a 10 MPa gauge pressure, preferably a normal pressure to a 5 MPa gauge pressure. The polymerization reaction type for the copolymer (B) can be any of a batch type, a semi-continuous type, and a continuous type. Further, the polymerization can be carried out in two or more separated stages which differ in reaction conditions.

The molecular weigh of the obtained copolymer (B) can be controlled, for example, by having hydrogen present in a polymerization system or by changing the polymerization temperature. When the molecular weight is controlled by having hydrogen present in the polymerization system, the addition amount of hydrogen in the order of 0.001 to 100 NL per kg of olefin is suitable. In addition, when the compound (b) (for example, triisobutylaluminum, methyaluminoxane, diethyl zinc, or the like) is used as a catalyst component, the molecular weight of the copolymer can be controlled by the amount of the compound (b) used.

In the thermoplastic elastomer composition according to the present invention, the weight ratio (A)/(B) of the crystalline olefin polymer (A) to the ethylene.α-olefin.non-conjugated polyene copolymer (B) is preferably 90/10 to 10/90, more preferably 60/40 to 20/80. When the weight ratio (A)/(B) is in the aforementioned range, molded articles having excellent mechanical properties and an excellent formability can be obtained.

<Ethylene.α-olefin Copolymer (C)>

To the thermoplastic elastomer composition (I) according to the present invention, an ethylene.α-olefin ($C_3$ or more) copolymer (C) (herein also referred to as copolymer (C)) may be added, as long as the effects of the present invention are achieved.

The ethylene.α-olefin ($C_3$ or more) copolymer (C) is a polymer obtained by copolymerizing ethylene and an α-olefin and is a polymer having a rubber elasticity at room temperature. The thermoplastic elastomer composition (III) according to the present invention contains a specific amount of the copolymer (C) and hence enhances the impact resistance and elongation at break at low temperature.

Examples of $C_3$ or more α-olefins serving as raw materials of the copolymer (C) include propylene, 1-butene, 1-pentene, 1-hexene, 1-octene, 1-decene, 2-methyl-1-propene, 3-methyl-1-pentene, 4-methyl-1-pentene, 5-methyl-1-hexene, and the like. Among these α-olefins, $C_3$-$C_{20}$ α-olefins such as propylene, 1-butene, 1-pentene, 1-hexene, 1-octene, 1-decene, 2-methyl-1-propene, 3-methyl-1-pentene, 4-methyl-1-pentene, and 5-methyl-1-hexene are preferable, and $C_3$-$C_8$ α-olefins such as propylene, 1-butene, 1-pentene, 1-hexene, 1-octene, 1-decene, 2-methyl-1-propene, 3-methyl-1-pentene, 4-methyl-1-pentene, and 5-methyl-1-hexene are preferable.

In the copolymer (C), the content of structural units derived from ethylene is preferably 30 to 95 mol %, more preferably 50 to 90 mol %, and the content of structural units derived from a $C_3$ or more n α-olefin is preferably 5 to 70 mol %, more preferably 10 to 50 mol %. In this regard, the total of the content of structural units derived from ethylene and the content of structural units derived from an α-olefin is 100 mol %.

The copolymer (C) preferably has a melt flow rate (MFR, ASTM D1238, 2.16 kg load) of preferably 0.01 to 50 (g/10 minutes), more preferably 0.05 to 45 (g/10 minutes), still more preferably 0.1 to 40 (g/10 minutes), as measured at 190° C. The MFR in the aforementioned range makes the fluidity and the impact resistance favorable and hence is preferable. For the MFR, less than 0.01 g/10 minutes may undesirably make the molding difficult, and more than 50 g/10 minutes may undesirably make the molecular weight of the ethylene.α-olefin copolymer (C) low, resulting in the remarkably reduced impact resistance, so that these MFRs are not preferable.

For the copolymer (C), the melting point (Tm) determined by differential scanning calorimetry (DSC) is usually less than 100° C. or substantially no melting point peak is observed by DSC; the melting point is preferably 95° C. or less or substantially no melting point peak is observed by DSC; more preferably, substantially no melting point peak is observed by DSC. Differential scanning calorimetry can be carried out in the same manner as aforementioned, for example. Here, that substantially no melting point peak is observed by DSC means that the amount of heat of fusion, ΔH (Tm) (unit: J/g), measured by DSC is substantially not observed, and, specifically, for example, in the range of −150 to 200° C., no crystalline melting peak with the amount of heat of fusion of 1 J/g or more is observed.

Examples of the copolymers (C) include ethylene.1-butene copolymers, ethylene.1-hexene copolymers, and ethylene.1-octene copolymers, and ethylene.1-butene copolymers and ethylene.1-octene copolymers can provide particularly an excellent impact resistance and elongation at break at low temperature, and hence are more preferable.

The copolymer (C) may be used singly or in combination of two or more kinds thereof.

In the composition according to the present invention, preferably the composition (III), the content of the polymer (A) is usually 30 to 70 parts by weight, preferably 32 to 65 parts by weight, more preferably 35 to 62 parts by weight, the content of the copolymer (B) is usually 1 to 30 parts by weight, preferably 2 to 28 parts by weight, more preferably 5 to 25 parts by weight, and the content of the copolymer (C) is usually 1 to 60 parts by weight, preferably 3 to 58 parts by weight, more preferably 5 to 55 parts by weight (provided that the total of the polymer (A), the copolymer (B), and the copolymer (C) is 100 parts by weight). As the content of the copolymer (C), less than 1 part by weight reduces the impact resistance, and more than 60 parts by weight reduces the heat resistance, so that these contents are not preferable. Having these characteristics can provide the composition (III) capable of providing a molded article having an impact resistance and an elongation at break that are excellent at low temperature, even in a case where the composition is not cross-linked.

<Peroxide-Based Cross-Linking Agent (D)>

To the thermoplastic elastomer composition (I) according to the present invention, a peroxide-based cross-linking agent (D) (herein also referred to as cross-linking agent (D)) may be added as long as it achieves the effects of the present invention.

The thermoplastic elastomer composition (II) according to the present invention is obtained by dynamically cross-linking the polymer (A) and the copolymer (B) with the cross-linking agent (D). Herein, "dynamically cross-linking" refers to cross-linking the composition while adding a shearing force thereto. Examples of the cross-linking agents (D) include inorganic peroxides and organic peroxides. Among these cross-linking agents (D), organic peroxides are preferable in terms of rubber elasticity.

Examples of organic peroxides include dicumyl peroxide, di-tert-butyl peroxide, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy) valerate, benzoyl peroxide, p-chlorobenzoyl peroxide, 2,4-dichlorobenzoyl peroxide, tert-butylperoxybenzoate, ert-butylperoxylsopropylcarbonate, diacetyl peroxide, lauroyl peroxide, tert-butyl cumyl peroxide, and the like.

Among these organic peroxides, 2,5-dimethyl-2,5-di-(tert-butylperoxyl) hexane and 2,5-dimethyl-2,5-di-(tert-butylperoxyl) hexyne-3,1,3-bis(tert-butylperoxylisopropyl) benzene are preferable, and 2,5-dimethyl-2,5-di-(tert-butylperoxyl) hexane are more preferable, in terms of odor property and scorch stability.

The cross-linking agent (D) is used in an amount of usually 0.02 to 3 parts by weight, preferably 0.05 to 1 part by weight, relative to the total 100 parts by weight of the polymer (A), the copolymer (B), and the other resin components, other rubber components, and softener (E) that are added if necessary.

The blending amount of the organic peroxides in the aforementioned range allows a composition having an excellent formability to be obtained, and, in addition, the obtained molded article has a suitable degree of cross-linking and a sufficient heat resistance, tensile characteristics, elastic recovery, and impact resilience.

In dynamically cross-linking by the cross-linking agent (D) in the present invention, auxiliary agents can be blended such as peroxyl cross-linking aids such as sulfur, p-quinonedioxime, p,p'-dibenzoylquinonedioxime, N-methyl-N-4-dinitrosoaniline, nitrosobenzene, diphenylguanidine, and trimethylolpropane-N,N'-m-phenylenedimaleimide; multifunctional methacrylate monomers such as divinylbenzene, triallyl cyanurate, ethyleneglycol dimethacrylate, diethyleneglycol dimethacrylate, polyethyleneglycol dimethacrylate, trimethylolpropane trimethacrylate, and allyl methacrylate; multifunctional vinyl monomers such as vinyl butyrate and vinyl stearate; and the like.

Uniform and gentle cross-linking reactions can be anticipated by using the aforementioned auxiliary agents. As the auxiliary agent, divinylbenzene is preferable. Divinylbenzene is easy to handle, has a favorable compatibility with the polymer (A) and the copolymer (B) that are included as main components in the thermoplastic elastomer composition (I) or (II), has the effect of solubilizing the cross-linking agent (D) (typically an organic peroxide), and acts as a dispersion agent of the cross-linking agent (D), so that the cross-linking effect by thermal treatment is homogeneous, allowing a thermoplastic elastomer composition having a balance between fluidity and physical properties to be obtained.

The auxiliary agents are used in an amount of usually 2 parts by weight or less, preferably 0.3 to 1 part by weight, relative to the total 100 parts by weight of the polymer (A), the copolymer (B), and the other resin components, other rubber components, and softener (E) that are added if necessary.

In addition, a dispersion accelerator may be used to accelerate the decomposition of the cross-linking agent (D) (typically an organic peroxide). Examples of decomposition accelerators include tertiary amines such as triethylamine, tributylamine, 2,4,6-tri (dimethylamino) phenol; naphthenates such as of aluminum, cobalt, vanadium, copper, calcium, zirconium, manganese, magnesium, lead, and mercury; and the like.

<Other Components>

To the thermoplastic elastomer composition according to the present invention, additives other than the aforementioned (co)polymers may be blended if appropriate to the extent that the effects of the present invention are not impaired. Examples of additives include, but are not particularly limited to, a softener (E), an inorganic filler (F), and the like. In addition, examples of additives include known additives used in the field of polyolefin, such as: rubbers other than the polymer (A), the copolymer (B), and the copolymer (C) (for example, propylene-based elastomers such as polyisobutylene, butyl rubber, propylene.ethylene copolymer rubber, propylene butene copolymer rubber, and propylene.butene.ethylene copolymer rubber, ethylene-based elastomers such as ethylene.propylene copolymer rubber, styrene-based elastomers such as styrene.butadiene.styrene block polymer, styrene.isoprene.styrene block polymer, styrene.isobutylene.styrene block polymer, and hydrogen additives thereof); thermosetting resins and resins other than a crystalline olefin polymer (A), such as thermoplastic resins such as polyolefin; heat stabilizers; age resistors; light stabilizers, weathering stabilizers; antistatic agents; metal soaps; aliphatic amides; lubricants such as wax; and the like.

These additives may be used singly or in combination of two or more kinds thereof. In addition, the blending amounts of additives other than the additives particularly mentioned herein are not limited to particular values as long as the effects of the present invention are achieved, and are each in the order of usually 0.0001 to 10 parts by weight, preferably 0.01 to 5 parts by weight, relative to the total 100 parts by weight of the polymer (A), the copolymer (B) and the copolymer (C).

As the softener (E), softeners usually used for rubber can be used. Examples of softeners (E) include petroleum-based softeners such as process oil, lubricating oil, paraffin oil, liquid paraffin, petroleum asphalt, and Vaseline; coal tar-based softeners such as coal tar and coal tar pitch; fatty oil-based softeners such as castor oil, linseed oil, rapeseed oil, soybean oil, and coconut oil; tall oil; substitute (factice); wax such as beeswax, carnauba wax, and lanolin; fatty acids or fatty acid salts thereof such as ricinoleic acid, palmitic acid, stearic acid, barium stearate, calcium stearate, and zinc laurate; naphthenic acid, pine oil, rosin or derivatives thereof; synthetic polymer materials such as terpene resins, petroleum resins, atactic polypropylene, and coumarone indene resins; ester-based softeners such as dioctyl phthalate, dioctyl adipate, and dioctyl sebacate; microcrystalline wax, liquid polybutadiene, modified liquid polybutadiene, liquid thiokol, and hydrocarbon-based synthetic lubricating oil; and the like.

These softeners (E) in the compositions (I) and (II) are used in an amount of usually 2 to 100 parts by weight, preferably 5 to 80 parts by weight, relative to the total 100 parts by weight of the polymer (A) and the copolymer (B), but are not particularly limited thereto as long as the effects of the present invention are achieved. The softeners (E) in the composition (III) are used in an amount of usually 1 to 100 parts by weight, preferably 1.5 to 80 parts by weight, relative to the total 100 parts by weight of the polymer (A), the copolymer (B), and the copolymer (C), but are not particularly limited thereto as long as the effects of the present invention are achieved. When the softener (E) is used in such an amount, the thermoplastic elastomer composition has an excellent fluidity during the manufacturing and molding thereof, does not allow the mechanical properties of the obtained molded article to be easily lowered, and also results in the obtained molded article having an excellent heat resistance and heat aging resistance.

Examples of inorganic fillers (F) include calcium carbonate, calcium silicate, clay, kaolin, talc, silica, silious earth, mica powder, asbestos, alumina, barium sulfate, aluminum sulfate, calcium sulfate, basic magnesium carbonate, molybdenum disulfide, graphite, glass fiber, glass bulb, shirasu balloon, basic magnesium sulfate whisker, calcium titanate whisker, aluminum borate whisker, and the like.

These inorganic fillers (F) in the compositions (I) and (II) are used in an amount of usually 2 to 100 parts by weight preferably 2 to 50 parts by weight, relative to the total 100 parts by weight of the polymer (A) and the copolymer (B), but are not particularly limited thereto as long as the effects of the present invention are achieved. These inorganic fillers (F) in the composition (III) are used in an amount of usually 0.1 to 100 parts by weight, preferably 1 to 50 parts by weight, relative to the total 100 parts by weight of the polymer (A), the copolymer (B) and the copolymer (C), but are not particularly limited thereto as long as the effects of the present invention are achieved.

When a rubber other than the copolymer (B) is used in the compositions (I) and (II), the rubber is used in an amount of usually 2 to 200 parts by weight, preferably 5 to 150 parts by weight, relative to the total 100 parts by weight of the polymer (A) and the copolymer (B). When a rubber other than the copolymer (B) and the copolymer (C) is used in the composition (III), the rubber is used in an amount of usually 1 to 200 parts by weight, preferably 3 to 150 parts by weight, relative to the total 100 parts by weight of the polymer (A), the copolymer (B) and the copolymer (C).

<<Thermoplastic Elastomer Compositions (I), (II), and (III)>>

The composition (I) according to the present invention can be obtained from a mixture containing the polymer (A), the copolymer (B), and an additive which is blended if necessary, by a known producing method, preferably by dynamic thermal treatment.

The composition (II) according to the present invention is obtained by dynamically thermal-treating and cross-linking (dynamically cross-linking) a mixture containing the polymer (A), the copolymer (B), and an additive which is blended if necessary, in the presence of the cross-linking agent (D).

The composition (III) according to the present invention can be obtained by mixing a mixture containing the polymer (A), the copolymer (B), the copolymer (C), and an additive which is blended if necessary, in the absence of a cross-linking agent, preferably by dynamically thermal-treating the mixture in the absence of a cross-linking agent.

As used herein, "dynamically thermal-treating" refers to kneading the composition in the molten state.

The composition (II) may be a composition wherein polymer components including the polymer (A) and the copolymer (B) are partially cross-linked or completely cross-linked.

Dynamic thermal treatment is preferably carried out in a closed type device, and preferably carried out in an inert gas atmosphere such as nitrogen and carbon dioxide. The thermal treatment temperature is in the range of usually the melting point of the polymer (A) to 300° C., preferably 150 to 280° C., more preferably 170 to 270° C. The kneading time is usually 0.25 to 20 minutes, preferably 0.5 to 10 minutes, more preferably 1 to 10 minutes. In addition, the added shearing force is in the range of usually 10 to 100,000 sec$^{-1}$, preferably 100 to 50,000 sec$^{-1}$, more preferably 1,000 to 10,000 sec$^{-1}$, still more preferably 2,000 to 7,000 sec$^{-1}$, as the highest shear rate.

Examples of kneading devices in kneading include mixing rolls, intensive mixers (for example, Banbury mixers, kneaders), uniaxial extruders, biaxial extruders, and the like. As these kneading devices, closed type devices are preferable.

The composition (I) and a molded article obtained by molding the composition (I) by a conventionally known method have an excellent low-temperature impact resistance.

The composition (II) and a molded article obtained by molding the composition (II) by a conventionally known method have a low-temperature impact resistance and mechanical properties that are both excellent. Because of this, the composition (II) and the molded articles can be used in a preferred manner for seal materials used under low temperature, such as packings for refrigerators; automobile parts such as automobile interior surface film materials, automobile airbag covers, mud guards, spoiler lips, and fender liners; industrial machine parts; electronic and electrical parts; construction materials; and the like.

The composition (III) and a molded article obtained by molding the composition (III) by a conventionally known method have an impact resistance and an elongation at break that are excellent at low temperature. Because of this, the composition (II) and the molded articles can be used in a preferred manner for seal materials used under low temperature, such as packings for refrigerators; automobile parts; industrial machine parts; electronic and electrical parts; construction materials; and the like. They can be used in a preferred manner particularly for automobile parts applications which need an impact resistance and elongation at break at low temperature, for example, automobile interior surface film materials, automobile airbag covers, and the like as automobile interior parts, and mud guards, spoiler lips, fender liners, and the like as automobile exterior parts.

EXAMPLES

The present invention will be described below in more detail with reference to Examples, but the present invention is not to be limited to these Examples. In the description below of Examples and the like, "parts" means "parts by weight" unless otherwise specified.

<Crystalline Olefin Polymer>
(A-1) Homo Polypropylene
PRIME POLYPRO™ 105 (trade name, made by Prime Polymer Co., Ltd.), whose melt flow rate (ASTM-D-1238-65T; 230° C., 2.16 kg load) is 9.0 g/10 minutes.
(A-2) Block Polypropylene
Polypropylene of a block type (the ethylene unit content: 9 mol %) whose melt flow rate (ASTM D1238-65T, 230° C., 2.16 kg load) is 55 g/10 minutes and whose melting point (Tm) is 161.8° C. as determined by DSC.
<Ethylene.α-olefin Copolymer>
(C-1) Ethylene.1-butene Copolymer>
A copolymer that includes ethylene and 1-butene, whose ethylene content is 81 mol %, whose melt flow rate (ASTM D1238, 190° C., 2.16 kg load) is 0.5 g/10 minutes, and whose melting point peak is substantially not observed by DSC.
<Ethylene.α-olefin.Non-Conjugated Polyene Copolymer>
(Molar Amount of Each Structural Unit)
The molar amount of structural units derived from ethylene [A], that of structural units derived from an α-olefin [B], and that of structural units derived from a non-conjugated polyene [C] were determined by measurement of intensity using a $^1$H-NMR spectrometer. For an oil extended ethylene.α-olefin.non-conjugated polyene copolymer, the ethylene.α-olefin.non-conjugated polyene copolymer was measured before it was oil extended.
[Mooney Viscosity]
Mooney viscosity ML$_{(1+4)}$(125° C.) was measured according to JIS K 6300 (1994), using the Mooney viscometer (produced by SHIMADZU CORPORATION, Model SMV202).
[Iodine Value]
The iodine values for the copolymers were determined by a titration method. Specifically, the following method was carried out.
The copolymer, 0.5 g, was dissolved in 60 ml of carbon tetrachloride, to which a small amount of Wijs reagent and a 20% potassium iodide solution were added, followed by titration with a 0.1 mol/L sodium thiosulfate solution. A starch indicator was added at around the endpoint, followed by good stirring and titration until the light purple color disappeared, and a g value of iodine was calculated as an amount of halogen consumed relative to 100 g of the sample. For an oil extended ethylene.α-olefin.non-conjugated polyene copolymer, the ethylene.α-olefin.non-conjugated polyene copolymer was measured before it was oil extended.
[B Value]
The measurement solvent was o-dichlorobenzene-d$_4$.benzene-d$_6$ (4/1 [v/v]). The $^{13}$C-NMR spectrum (100 MHz, produced by JEOL LTD., ECX400P) was measured at a measurement temperature of 120° C. to calculate the B value based on the following equation (i). For an oil extended ethylene.α-olefin.non-conjugated polyene copolymer, the ethylene.α-olefin.non-conjugated polyene copolymer was measured before it was oil extended.

$$B \text{ value}=([EX]+2[Y])/[2\times[E]\times([X]+[Y])] \quad (i)$$

wherein [E], [X] and [Y] represent a mole fraction of the ethylene [A], the C$_4$-C$_{20}$ α-olefin [B] and the non-conjugated polyene [C] respectively, and [EX] represents an ethylene [A]-C$_4$-C$_{20}$ α-olefin [B] diad chain fraction.

Synthesis of Transition Metal Compound

Synthesis of [bis(4-methoxyphenyl)methylene(η$^5$-cyclopentadienyl)(η$^5$-2,3,6,7-tetramethylfluorenyl)] hafnium Dichloride (Catalyst-a1)

(i) Synthesis of 6,6-bis(4-methoxyphenyl)fulvene

In nitrogen atmosphere, to a 500 ml three-neck flask, 8.28 g (115 mmol) of lithium cyclopentadienide, and 200 ml of dehydrated THF (tetrahydrofuran) were added. With the mixture cooled in an ice bath, 13.6 g (119 mmol) of DMI (1,3-dimethyl-2-imidazolidinone) was added. The mixture was stirred at room temperature for 30 minutes. Thereafter, 25.3 g (105 mol) of 4,4'-dimethoxybenzophenone was added. The mixture was stirred under heat refluxing for week. With the mixture cooled in an ice bath, 100 ml of water was gradually added, and further, 200 ml of dichloromethane was added. The mixture was stirred at room temperature for 30 minutes. The resultant two-layer solution was transferred to a 500 ml separating funnel. The organic layer was washed three times with 200 ml of water. The organic layer washed was dried with anhydrous magnesium sulfate for 30 minutes. Thereafter, the solvent was distilled off under reduced pressure. As a result, an orange-brown solid was obtained, which was then subjected to separation with silica gel chromatograph (700 g, hexane: ethyl acetate=4:1). As a result, a red solution was obtained. The solvent was distilled off under reduced pressure. As a result, 9.32 g (32.1 mmol, 30.7%) of 6,6-bis(4-methoxyphenyl) fulvene was obtained as an orange solid. 6,6-bis(4-methoxyphenyl)fulvene was identified by $^1$H NMR spectrum. The measured value thereof is shown below.

$^1$H NMR spectrum (270 MHz, CDCl$_3$): δ/ppm 7.28-7.23 (m, 4H), 6.92-6.87 (m, 4H), 6.59-6.57 (m, 2H), 6.30-6.28 (m, 2H), 3.84 (s, 6H)

(ii) Synthesis of bis(4-methoxyphenyl)(cyclopentadienyl)(2,3,6,7-tetramethylfluorenyl)methane In nitrogen atmosphere, to a 100 ml three-neck flask, 500 mg (2.25 mmol) of 2,3,6,7-tetramethylfluorene, and 40 ml of dehydrated t-butylmethyl ether were added. With the mixture cooled in an ice bath, 1.45 ml (2.36 mmol) of an n-butyllithium.hexane solution (1.63 M) was gradually added. The mixture was stirred at room temperature for 18 hours. 591 mg (2.03 mmol) of 6,6-bis(4-methoxyphenyl) fulvene was added. The mixture was subjected to heat refluxing for 3 days. With the mixture cooled in an ice bath, 50 ml of water was gradually added. The resultant solution was transferred to a 300 ml separating funnel, to which 50 ml of dichloromethane was added. The mixture was shaken several times to separate off the aqueous layer. The organic layer was washed three times with 50 ml of water. The organic layer washed was dried with anhydrous magnesium sulfate for 30 minutes. Thereafter, the solvent was distilled off under reduced pressure. The resultant solid was washed with a small amount of diethyl ether. As a result, a white solid was obtained. Further, the solvent of the washing liquid was distilled off under reduced pressure. The resultant solid was washed with a small amount of diethyl ether to collect a white solid, which was combined with the white solid previously obtained. The resultant solid was dried under reduced pressure. As a result, 793 mg (1.55 mmol, 76.0%) of bis(4-methoxyphenyl)(cyclopentadienyl)(2,3,6,7-tetramethylfluorenyl) methane was obtained. bis(4-methoxyphenyl)(cyclopentadienyl)(2,3,6,7-tetramethylfluorenyl)methane was identified by FD-MS spectrum. The measured value thereof is shown below.

FD-MS Spectrum: M/z 512 (M$^+$)

(iii) Synthesis of [bis(4-methoxyphenyl)methylene (η$^4$-cyclopentadienyl)(η$^5$-2,3,6,7-tetramethylfluorenyl)]hafnium Dichloride In nitrogen atmosphere, to a 100 ml Schlenk flask, 272 mg (0.531 mmol) of bis(4-methoxyphenyl)(cyclopentadienyl)(2,3,6,7-tetramethylfluorenyl)methane, 20 ml of dehydrated toluene, and 90 μl (1.1 mmol) of THF were sequentially added. With the mixture cooled in an ice bath, 0.68 ml (1.1 mmol) of an n-butyllithium/hexane solution (1.63 M) was gradually added. The mixture was stirred at 45° C. for 5 hours. As a result, a red solution was obtained. The solvent was distilled off under reduced pressure, and 20 ml of dehydrated diethyl ether was added to provide a red solution again. With the solution cooled in a methanol/dry ice bath, 164 mg (0.511 mmol) of hafnium tetrachloride was added. While the temperature was gradually elevated to room temperature, the mixture was stirred for 16 hours. As a result, a yellow slurry was obtained. The solvent was distilled off under reduced pressure. The resultant solid was transferred into a glove box, washed with hexane, and thereafter extracted with dichloromethane. The solvent was distilled off under reduced pressure. The resultant solid was allowed to dissolve in a small amount of dichloromethane, and hexane was added to perform recrystallization at −20° C. A solid precipitated was collected, washed with hexane, and dried under reduced pressure. As a result, 275 mg (0.362 mmol, 70.8%) of [bis(4-methoxyphenyl)methylene(η$^5$-cyclopentadienyl)(η$^5$-2,3,6,7-tetramethylfluorenyl)]hafnium dichloride was obtained as a yellow solid. [bis(4-methoxyphenyl)methylene(η$^5$-cyclopentadienyl)(η$^5$-2,3,6,7-tetramethylfluorenyl)]hafnium dichloride was identified by $^1$H NMR spectrum and FD-MS spectrum. The measured value thereof is shown below.

$^1$H NMR spectrum (270 MHz, CDCl$_3$): δ/ppm 7.87 (s, 2H), 7.80-7.66 (m, 4H), 6.94-6.83 (m, 4H), 6.24 (t, J=2.6 Hz, 2H), 6.15 (s, 2H), 5.65 (t, J=2.6 Hz, 2H), 3.80 (s, 6H), 2.47 (s, 6H), 2.05 (s, 6H)

FD-MS spectrum: M/z 760 (M$^+$)

The chemical formula of the resulting catalyst-a1 is shown below.

[Chem. 7]

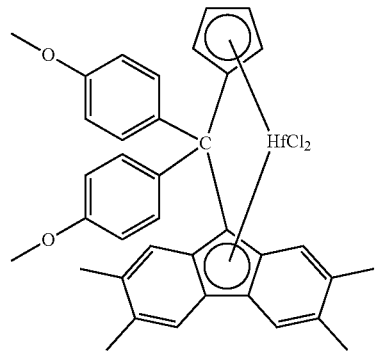

Manufacturing Example 1

(B-1) Ethylene.1-butene.5-ethylidene-2-norbornene Copolymer (EBDM-1)

Using a polymerization reactor having a volume of 300 L and provided with a mixing blade, the polymerization reaction of ethylene, 1-butene, and 5-ethylidene-2-norbornene (ENB) was carried out continuously at 95° C.

Hexane (feed amount: 32 L/h) was used as a polymerization solvent and continuously fed into the polymerization reactor so that the amount of feed of ethylene was 3.2 kg/h, the amount of feed of 1-butene was 12 kg/h, the amount of feed of ENB was 520 g/h, and the amount of feed of hydrogen was 0 N L/h (normal liter).

While the polymerization pressure and the polymerization temperature were maintained at 1.6 MPaG and 95° C. respectively, the catalyst-a1 was used as the main catalyst and fed continuously into the polymerization reactor in an amount of feed of 0.030 mmol/h. Additionally, $(C_6H_5)_3CB(C_6F_5)_4$(CB-3) as a cocatalyst in an amount of feed of 0.15 mmol/h and triisobutylaluminum (TIBA) as an organoaluminum compound in an amount of feed of 10 mmol/h were continuously fed into the polymerization reactor.

Thus, a solution containing 15% by weight of the ethylene.1-butene.ENB copolymer formed from ethylene, 1-butene, and ENB was obtained. To the polymerization reaction liquid drawn from the lower portion of the polymerization reactor, a small amount of methanol was added to terminate the polymerization reaction, and the ethylene.1-butene.ENB copolymer was separated from the solvent by a steam stripping treatment and then dried under reduced pressure at 80° C. for one whole day and night.

By the above procedure, the ethylene.1-butene.ENB copolymer (EBDM-1) formed from ethylene, 1-butene, and ENB was obtained at a rate of 5.4 kg per hour.

The properties of the resulting EBDM-1 were measured in the method described above. The results are shown in Table 1.

Manufacturing Example 2

(B-2) Ethylene.1-butene.5-ethylidene-2-norbornene Copolymer (EBDM-2)

EBDM-1, 100 parts by weight, obtained in Manufacturing Example 1 was oil-extended further with 10 parts by weight of DIANA PROCESS PW-100 to obtain an ethylene.1-butene.ENB copolymer (EBDM-2). The properties of the resulting EBDM-2 were measured in the method described above. The results are shown in Table 1.

Manufacturing Example 3

(b-1) Ethylene.propylene.5-ethylidene-2-norbornene Copolymer (EPDM-1)

Using a polymerization reactor having a volume of 300 L and provided with a mixing blade, the polymerization reaction of ethylene, propylene, and 5-ethylidene-2-norbornene (ENB) was carried out continuously at 80° C.

Hexane (feed amount: 26.8 L; h) was used as a polymerization solvent and continuously fed into the polymerization reactor so that the amount of feed of ethylene was 4.0 kg/h, the amount of feed of propylene was 5.2 kg/h, the amount of feed of ENB was 1.2 kg/h, and the amount of feed of hydrogen was 25 N L/h (normal liter).

While the polymerization pressure and the polymerization temperature were maintained at 2.1 MPaG and 80° C. respectively, [N-(1,1-dimethylethyl)-1,1-dimethyl-1-[(1,2,3,3A,8A-η)-1,5,6,7-tetrahydro-2-methyl-S-indacene-1-yl]silaneaminate(2-)-κN][(1,2,3,4-η)-1,3-pentadiene]-titanium was used as the main catalyst and fed continuously into the polymerization reactor in an amount of feed of 0.070 mmol/h. Additionally, $(C_6H_5)_3CB(C_6F_5)_4$(CB-3) as a cocatalyst in an amount of feed of 0.28 mmol/h and triisobutylaluminum (TIBA) as an organoaluminum compound in an amount of feed of 1.8 mmol/h were continuously fed into the polymerization reactor.

Thus, a solution containing 15% by weight of the ethylene.propylene.ENB copolymer formed from ethylene, propylene and ENB was obtained. To the polymerization reaction liquid drawn from the lower portion of the polymerization reactor, a small amount of methanol was added to terminate the polymerization reaction, and the ethylene.propylene.ENB copolymer was separated from the solvent by a steam stripping treatment and then dried under reduced pressure at 80° C. for one whole day and night.

By the above procedure, the ethylene.propylene.ENB copolymer (EPDM-1) formed from ethylene, propylene and ENB was obtained at a rate of 5.4 kg per hour.

The properties of the resulting EPDM-1 were measured in the method described above. The results are shown in Table 1.

Manufacturing Example 4

(b-2) Ethylene.propylene.5-ethylidene-2-norbornene Copolymer (EPDM-2)

EPDM-1, 100 parts by weight, obtained in Manufacturing Example 3 was oil-extended further with 10 parts by weight of DIANA PROCESS PW-100 to obtain an ethylene.propylene.ENB copolymer (EPDM-2). The properties of the resulting EPDM-2 were measured in the method described above. The results are shown in Table 1.

TABLE 1

| Properties of EBDM and EPDM | | | | |
|---|---|---|---|---|
|  | EBDM-1 | EBDM-2 | EPDM-1 | EPDM-2 |
| Requirement (1): B value | 1.28 | 1.28 | 1.00 | 1.00 |
| Ethylene unit content (mol %) | 60 | 60 | 60 | 60 |
| Requirement (2): $C_2/C_\alpha$ molar ratio | 60.5/39.5 | 60.5/39.5 | 60.1/39.9 | 60.1/39.9 |
| Requirement (3): Mooney viscosity $ML_{(1+4)}125°$ C. | 85 | 67 | 81 | 59 |
| Iodine value (g/100 g) | 9 | 9 | 11 | 11 |
| Requirement (4): Non-conjugated polyene content (mol %) | 1.4 | 1.4 | 1.4 | 1.4 |

<Properties of Thermoplastic Elastomer Compositions and Molded Articles>

The methods for evaluating the properties of thermoplastic elastomer compositions and the molded articles in the undermentioned Examples and Comparative Examples are as follows.

Shore D Hardness

Example 1 and Comparative Example 1

Pellets of the obtained thermoplastic elastomer composition were pressed at 210° C. to make a 2 mm thick pressed sheet, and a layered sheet 6 mm in thickness (three 2 mm thick pieces layered) was used for measurement by a Shore D hardness meter in accordance with JIS K6253.

Example 2 and Comparative Example 2

In accordance with JIS K6253, 3 mm thick injection-molded rectangular plates were used for a layered sheet 6 mm in thickness (two 3 mm thick pieces layered), which was used for measurement by a Shore D hardness meter. For the Shore D hardness, the value was determined 5 seconds after a measurement.

MFR (g/10 Minutes)

Example 1 and Comparative Example 1

A measurement was made with a load of 2.16 kgf at 230° C. in accordance with JIS K7210.

Example 2 and Comparative Example 2

A measurement of MFR was made with a load of 2.16 kgf at 230° C. in accordance with ASTM D1238 (unit: g/10 min).

Compression Set (CS)

Example 1 and Comparative Example 1

In accordance with JIS K6250, 2 mm thick pressed sheets made as aforementioned were layered, and a compression set test was carried out in accordance with JIS K6262.

The test conditions were the use of a 12 mm thick layered sheet (six 2 mm thick pieces layered), 25% compression, and compression at −30° C., 23° C., and 70° C., each under the condition of 24 hours, and a measurement was made after 30 minutes elapsed after strain removal (compression).

Tensile Characteristics

Example 1 and Comparative Example 1

In accordance with JIS K6251(2010), a dumbbell shaped JIS-No. 3 type test piece was made out of a 2 mm thick pressed sheet made as aforementioned, and the test piece was used for measurement at a pulling rate of 500 mm/min.
Measurement temperature: 23° C.
M100: stress at 100% elongation
TB: tensile strength
EB: tensile elongation at break Tensile Strength, Elongation at Break Example 2 and Comparative Example 2

In accordance with JIS K6251, a test piece (JIS No. 3 dumbbell, 2 mm in thickness) was made by injection molding and measured for tensile strength (unit: MPa) and elongation at break (unit: %) under a 23° C. and a −35° C. atmosphere at a pulling rate of 500 mm/min.

Low-Temperature Embrittlement Temperature

Example 1 and Comparative Example 1

In accordance with JIS K6261, an A type test piece was made out of a 2 mm thick pressed sheet made as aforementioned, and the test piece was used for measurement by the BTC method.

Tear Strength

Example 1 and Comparative Example 1

In accordance with JIS K6252, an angle type test piece was made out of a 2 mm thick pressed sheet made as aforementioned, and the test piece was used for measurement.

Appearance of Molded Article

Example 1 and Comparative Example 1

A 150 mm×120 mm×3 mm rectangular plate was made out of the resulting pellets of the thermoplastic elastomer composition using a 100 t injection molding machine, and the resulting rectangular plate was evaluated for appearance by visual observation.

Izod Impact Strength

Example 1 and Comparative Example 1

In accordance with ASTM D256, a test piece (63.5 mm×12.5 mm×3 mm) with a notch was made out of the pellets of the obtained thermoplastic elastomer composition using a 100 t injection molding machine, and tested for impact test at 23° C., −30° C., −40° C., −45° C., and −50° C. The test at each temperature was carried out to 5 test pieces, and the measurement results indicate the average values of the results.

Example 2 and Comparative Example 2

In accordance with ASTM D256, a test piece (3.2 mm in thickness) with a notch for IZOD impact strength was made by injection molding, and the test piece was measured at a temperature of −45° C. for the break state (NB: Non-Break, B: Break) and impact strength (unit: J/m).

Example 1

EBDM-2, 110 parts by weight, obtained in Manufacturing Example 2 and 40 parts by weight of polypropylene (A-1) were mixed sufficiently using a Banbury mixer to obtain masterbatch pellets. Into these, 0.17 parts by weight of organic peroxide (trade name: PERHEXA 25B, compound name: 2,5-dimethyl-2,5-di(t-butylperoxy) hexane single compound product, made by NOF Corporation) as a cross-linking agent, 0.17 parts by weight of divinylbenzene as a cross-linking aid, 0.2 parts by weight phenol-based antioxidant (IRGANOX 1010, made by BASF Japan Co., Ltd.) as an antioxidant, 2.5 parts by weight of carbon black masterbatch (F-32387MM, made by Maeda Industrial Chemicals Co., Ltd.), and 0.17 parts by weight of softener (DIANA PROCESS PW-100) were sufficiently mixed with a Henschel mixer, and the resulting mixture was dynamically cross-linked with an extruder (Model No. KTX-46, made by Kobe Steel Ltd.; cylinder temperature: C1: 120° C., C2 to C3: 130° C., C4: 140° C., C5: 180° C., C6: 200° C., C7 to C14: 230° C.; die temperature: 220° C.; screw speed: 400 rpm; extruder rate: 60 kg/h) to obtain pellets of the thermoplastic elastomer composition. The properties of the resulting thermoplastic elastomer composition were measured in the method described above. The results are shown in Table 2.

Comparative Example 1

Pellets of the thermoplastic elastomer composition were obtained in the same manner as in Example 1 except that EPDM-2 obtained in Manufacturing Example 4 was used in place of EBDM-2. The properties of the resulting thermoplastic elastomer composition were measured in the method described above. The results are shown in Table 2. Here, the low-temperature embrittlement temperature was the measurement lower limit value or less (less than −70° C.) In addition, the measurement results of Izod impact strength at −45° C. mean that, out of the measured 5 test pieces, 4 test pieces were partially broken and one test piece was completely broken, and the average value of the 4 partially broken cases and the value of the completely broken case are described separately.

TABLE 2

|  |  | Example 1 | Comparative Example 1 |
|---|---|---|---|
| Shore D hardness |  | 50 | 51 |
| MFR [g/10 min] | 230° C. × 2.16 kg | 2.3 | 1.8 |
| CS [%] | −30° C. | 98 | 99 |
|  | 23° C. | 61 | 61 |
|  | 70° C. | 75 | 75 |
| Low-temperature embrittlement temperature | (pressed sheet) | −67.3° C. | less than −70° C. |
| M100 [MPa] |  | 8.6 | 7.9 |
| TB [MPa] |  | 12.6 | 9.7 |
| EB [%] |  | 698 | 474 |
| Tear strength [N/mm] |  | 78 | 69 |
| Izod impact strength [J/m] | 23° C. | 557 (partial break) | 588 (partial break) |
|  | −30° C. | 994 (partial break) | 1,036 (partial break) |
|  | −40° C. | 1,114 (partial break) | 1,134 (partial break) |
|  | −45° C. | 1,107 (partial break) | (N = 4) 991 (partial break) (N = 1) 170 (complete break) |
|  | −50° C. | 166 (complete break) | 54 (complete break) |

Example 2

Twenty-seven parts by weight of block polypropylene (A-2), 66 parts by weight of EBDM-1 obtained in Manufacturing Example 1, and 7 parts of softener (D) (DIANA PROCESS PW-100, paraffin-based process oil, made by Idemitsu Kosan Co., Ltd) were previously mixed with an enclosed mixer [MIXTRON BB16, made by Kobe Steel Ltd.], passed through a sheeting roll to become sheet-shaped, and made into a rectangular pellet masterbatch with a pelletizer made by Horai Co., Ltd.

Then, 27.3 parts by weight of the resulting masterbatch pellet, 47.7 parts by weight of block polypropylene (A-1), 25 parts by weight of the ethylene.1-butene copolymer (C-1), 0.1 parts by weight of phenol-based antioxidant (IRGANOX® 1010, made by BASF Japan Co., Ltd.) as a heat stabilizer, 0.1 parts by weight of diazo-based weathering stabilizer (TINUVIN® 326, BASE Japan Co., Ltd.) as a weathering stabilizer were sufficiently mixed with a Henschel mixer, kneaded at 220° C. at a treatment rate of 60 kg per hour with an extruder (Model KTX-4 6, made by Kobe Steel Ltd.), to obtain pellets of the thermoplastic elastomer composition. The properties measurement results of the resulting thermoplastic elastomer are shown in Table 3.

Comparative Example 2

Pellets of the thermoplastic elastomer composition were obtained in the same manner as in Example 1 except that EPDM-1 obtained in Manufacturing Example 3 was used in place of EBDM-1 obtained in Manufacturing Example 1. The properties measurement results of the resulting thermoplastic elastomer are shown in Table 3.

TABLE 3

|  |  | Example 2 | | | Comparative Example 2 | | |
|---|---|---|---|---|---|---|---|
|  |  | Masterbatch marking | → | Component-by-component marking | Masterbatch marking | → | Component-by-component marking |
| (A-1) block polypropylene | parts by weight | 47.7 | 47.7 | 55 | 47.7 | 47.7 | 55 |
|  | parts by weight | masterbatch | 7.3 |  | masterbatch | 7.3 |  |
| (B-1) EBDM-1 | parts by weight | 27.3 | 18 | 18 | 27.3 | — | — |
| (b-1) EPDM-1 | parts by weight | — | — | — | — | 18 | 18 |
| (D) paraffin-based process oil | parts by weight | — | 2 | 2 | — | 2 | 2 |
| (C-1) ethylene•1-butene copolymer | parts by weight | 25 | 25 | 25 | 25 | 25 | 25 |
| Phenol-based antioxidant | parts by weight | 0.1 | 0.1 | 0.1 | 0.1 | 0.1 | 0.1 |
| Diazo-based weathering stabilizer | parts by weight | 0.1 | 0.1 | 0.1 | 0.1 | 0.1 | 0.1 |
| MFR (230° C., 2.16 kg load) | g/10 min |  | 9.0 |  |  | 9.2 |  |
| Shore D hardness (after 5 seconds) | — |  | 41 |  |  | 42 |  |
| Tensile strength (23° C.) | MPa |  | 13.2 |  |  | 13.1 |  |
| Elongation at break (23° C.) | % |  | 450 |  |  | 350 |  |
| Tensile strength (−35° C.) | MPa |  | 26.0 |  |  | 27.3 |  |
| Elongation at break (−35° C.) | % |  | 90 |  |  | 60 |  |
| IZOD impact test (−45° C.) | (J/m) |  | NB (1050) |  |  | NB (970) |  |

It is generally known that EBDM has flexibility and low-temperature characteristics which are excellent compared to EPDM. As far as elongation at break at low temperature is concerned, however, flexible polymers may be rather prone to breaking, so that it was difficult to predict, from temperature characteristics (Tg) and the like, which exhibits a better value, EPDM or EBDM. Thus, the excellent results of the low-temperature elongation at break that the Examples herein exhibited, compared to Comparative Examples, have been unexpected effects.

The invention claimed is:

1. A thermoplastic elastomer composition comprising a crystalline olefin polymer (A) and an ethylene.α-olefin($C_4$-$C_{20}$).non-conjugated polyene copolymer (B) satisfying the following requirements (1) and (2):

(1) a B value represented by the following equation (i) is 1.20 or more:

$$B \text{ value} = ([EX] + 2[Y])/[2 \times [E] \times ([X] + [Y])] \tag{i}$$

(wherein [E], [X] and [Y] represent a mole fraction of structural units derived from ethylene, a mole fraction of structural units derived from a $C_4$-$C_{20}$ α-olefin and a mole fraction of structural units derived from a non-conjugated polyene respectively, and [EX] represents a diad chain fraction of the structural units derived from the ethylene—the structural units derived from the $C_4$-$C_{20}$ α-olefin); and (2) in the copolymer (B), the molar ratio of the structural units derived from the ethylene to the structural units derived from the α-olefin ($C_4$-$C_{20}$) is 40/60 to 90/10.

2. The thermoplastic elastomer composition according to claim 1, wherein the copolymer (B) further satisfies at least one of the following requirements (3) and (4):

(3) a Mooney viscosity $ML_{(1+4)}$(125° C.) of the copolymer (B) is 5 to 100; and (4) the content of the structural units derived from the non-conjugated polyene is 0.1 to 6.0 mol % relative to the total 100 mol % of the structural units derived from the ethylene, the structural units derived from the α-olefin ($C_4$-$C_{20}$), and the structural units derived from the non-conjugated polyene.

3. The thermoplastic elastomer composition according to claim 1, wherein the α-olefin of the copolymer (B) is 1-butene.

4. The thermoplastic elastomer composition according to claim 1, which is obtained by dynamically cross-linking the polymer (A), the copolymer (B) and a peroxide-based cross-linking agent (D).

5. The thermoplastic elastomer composition according to claim 4, wherein the peroxide-based cross-linking agent (D) is an organic peroxide.

6. The thermoplastic elastomer composition according to claim 4, wherein the polymer (A) is a propylene-based (co)polymer.

7. The thermoplastic elastomer composition according to claim 1, comprising the polymer (A) and the copolymer (B) at a weight ratio of (A)/(B)=90/10 to 10/90.

8. The thermoplastic elastomer composition according to claim 1, comprising 30 to 70 parts by weight of the polymer (A), 1 to 30 parts by weight of the copolymer (B), and 1 to 60 parts by weight of an ethylene.α-olefin ($C_3$ or more) copolymer (C) (provided that the total of the polymer (A), the copolymer (B) and the copolymer (C) is 100 parts by weight).

9. The thermoplastic elastomer composition according to claim 8, which is obtained by dynamic thermal treatment in the absence of a cross-linking agent.

10. The thermoplastic elastomer composition according to claim 8, wherein the polymer (A) is a block copolymer of propylene and an α-olefin other than propylene.

11. The thermoplastic elastomer composition according to claim 8, wherein the copolymer (C) has a melt flow rate (ASTM D1238, 2.16 kg load) of 0.01 to 50 (g/10 minutes) as measured at 190° C.

12. A molded article obtained from the thermoplastic elastomer composition according to claim 1.

13. An automobile part obtained using the thermoplastic elastomer composition according to claim 1.

14. An airbag cover for automobiles, which is obtained using the thermoplastic elastomer composition according to claim 1.

15. A method for producing a thermoplastic elastomer composition, comprising dynamically cross-linking a crystalline olefin polymer (A), an ethylene.α-olefin($C_4$-$C_{20}$) .non-conjugated polyene copolymer (B) wherein a B value represented by the following equation (i) is 1.20 or more, and a peroxide-based cross-linking agent (D):

$$B \text{ value} = ([EX]+2[Y])/[2\times[E]\times([X]+[Y])] \quad \text{(i)}$$

(wherein [E], [X] and [Y] represent a mole fraction of structural units derived from ethylene, a mole fraction of structural units derived from a $C_4$-$C_{20}$ α-olefin and a mole fraction of structural units derived from a non-conjugated polyene respectively, and [EX] represents a diad chain fraction of the structural units derived from the ethylene—the structural units derived from the $C_4$-$C_{20}$ α-olefin).

* * * * *